United States Patent
Konishi

(10) Patent No.: US 9,336,093 B2
(45) Date of Patent: May 10, 2016

(54) INFORMATION PROCESSING SYSTEM AND ACCESS CONTROL METHOD

(71) Applicant: FUJITSU LIMITED, Kawasaki-shi, Kanagawa (JP)

(72) Inventor: Yotaro Konishi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 248 days.

(21) Appl. No.: 13/890,726

(22) Filed: May 9, 2013

(65) Prior Publication Data

US 2014/0032960 A1 Jan. 30, 2014

(30) Foreign Application Priority Data

Jul. 24, 2012 (JP) ................................. 2012-163861

(51) Int. Cl.
| | |
|---|---|
| *G06F 11/07* | (2006.01) |
| *G06F 11/14* | (2006.01) |
| *G06F 11/20* | (2006.01) |
| *G06F 11/30* | (2006.01) |

(52) U.S. Cl.
CPC ........ *G06F 11/1456* (2013.01); *G06F 11/2025* (2013.01); *G06F 11/2028* (2013.01); *G06F 11/2033* (2013.01); *G06F 11/2035* (2013.01); *G06F 11/2041* (2013.01); *G06F 11/2046* (2013.01); *G06F 11/2094* (2013.01); *G06F 11/3034* (2013.01); *G06F 11/3055* (2013.01)

(58) Field of Classification Search
CPC .............. G06F 11/0793; G06F 11/201; G06F 11/2033; G06F 11/2092
USPC .................................................. 714/5.11, 42
See application file for complete search history.

(56) References Cited

U.S. PATENT DOCUMENTS

| | | | |
|---|---|---|---|
| 2003/0135782 A1* | 7/2003 | Matsunami et al. ............... | 714/5 |
| 2003/0233382 A1 | 12/2003 | Gemba et al. | |
| 2004/0073648 A1 | 4/2004 | Tanino et al. | |
| 2005/0005062 A1* | 1/2005 | Liu et al. ........................ | 711/112 |
| 2005/0010715 A1* | 1/2005 | Davies et al. .................. | 711/100 |

(Continued)

FOREIGN PATENT DOCUMENTS

| | | |
|---|---|---|
| JP | 2003-203018 | 7/2003 |
| JP | 2004-21557 | 1/2004 |

(Continued)

OTHER PUBLICATIONS

Japanese Office Action issued Mar. 15, 2016 in corresponding Japanese Patent Application No. 2012-163861.

*Primary Examiner* — Chae Ko
(74) *Attorney, Agent, or Firm* — Staas & Halsey LLP

(57) ABSTRACT

An information processing system includes a plurality of storage devices, a plurality of data access devices, and a first processor. The first processor selects, when a first data access device permitted to access data in a first storage device fails, a second data access device other than the first data access device. The first data access device is included in the plurality of data access devices. The first storage device is included in the plurality of storage devices. The second data access device is included in the plurality of data access devices. The first processor permits the second data access device to access data in the first storage device. The first processor updates correspondence information, which indicates the first data access device as a transfer destination of a request to access first data in the first storage device, to indicate the second data access device as the transfer destination.

10 Claims, 14 Drawing Sheets

(56) References Cited

U.S. PATENT DOCUMENTS

| | | | |
|---|---|---|---|
| 2005/0166016 A1* | 7/2005 | Morimoto | 711/114 |
| 2006/0184760 A1* | 8/2006 | Fujibayashi et al. | 711/170 |
| 2007/0067591 A1 | 3/2007 | Shiraki et al. | |
| 2007/0174659 A1 | 7/2007 | Takuwa et al. | |
| 2007/0294564 A1* | 12/2007 | Reddin et al. | 714/6 |
| 2008/0091972 A1* | 4/2008 | Tanaka et al. | 714/5 |
| 2009/0327481 A1* | 12/2009 | Rickard et al. | 709/224 |
| 2010/0161751 A1* | 6/2010 | Stewart | 709/213 |
| 2011/0208933 A1* | 8/2011 | Selfin et al. | 711/162 |
| 2011/0246510 A1 | 10/2011 | Takahashi | |
| 2012/0036387 A1* | 2/2012 | Nakashima et al. | 713/340 |
| 2012/0166699 A1* | 6/2012 | Kumar et al. | 710/306 |
| 2012/0166724 A1* | 6/2012 | Smith | 711/114 |
| 2013/0047028 A1* | 2/2013 | Daikokuya et al. | 714/6.3 |
| 2013/0067274 A1* | 3/2013 | Huang et al. | 714/6.22 |
| 2013/0132766 A1* | 5/2013 | Bhatia et al. | 714/5.11 |
| 2013/0205165 A1* | 8/2013 | Kottomtharayil et al. | 714/6.3 |
| 2013/0262924 A1* | 10/2013 | Ogihara et al. | 714/15 |
| 2013/0275630 A1* | 10/2013 | Mizuno et al. | 710/22 |

FOREIGN PATENT DOCUMENTS

| | | |
|---|---|---|
| JP | 2004-88570 | 3/2004 |
| JP | 2005-346410 | 12/2005 |
| JP | 2007-87059 | 4/2007 |
| JP | 2007-164394 | 6/2007 |
| JP | 2011-215924 | 10/2011 |

* cited by examiner

INFORMATION PROCESSING SYSTEM AND ACCESS CONTROL METHOD

CROSS-REFERENCE TO RELATED APPLICATION

This application is based upon and claims the benefit of priority of the prior Japanese Patent Application No. 2012-163861, filed on Jul. 24, 2012, the entire contents of which are incorporated herein by reference.

FIELD

The embodiments discussed herein are related to an information processing system and an access control method.

BACKGROUND

In a computer system, various data items are retained in storage apparatuses connected to servers. If a server fails, access to data in a storage apparatus connected to the failed server is often disabled. Thus, there may be a case in which a data access environment for storage apparatuses is deteriorated.

In view of the above situation, to enable access to data in a storage apparatus even if a server to which the storage apparatus is connected fails, identical data is redundantly retained in storage apparatuses connected to a plurality of servers. Thus, even if a server fails, data identical to data managed by the failed server is acquired from another server, enabling service to be continued. An example of technologies by which data is made redundant in server units is the Redundant Array of Independent Nodes (RAIN).

An example of technologies by which data is made redundant is a mirroring technology. In the mirroring technology, a copy (redundant data) of data in a hard disk drive (HDD) managed by a server is stored in an HDD managed by another server (mirror server). Another technology by which data is made redundant is so-called replication. In replication, a replica of data managed by a server is managed by another server so that the original data and the replica are synchronized with each other. In replication, it is possible to manage replicas created in data units called objects in a plurality of servers in a distributed manner.

If data is made redundant as described above, then even if one server fails, service may be continued. If a server fails, however, data redundancy is lowered and data reliability is also lowered. Thus, recovery processing is carried out to recover redundancy. In recovery processing, a copy of redundant data of data that has been managed by the failed server is transferred to a normal server, for example. After this, the server that has received the copy of the redundant data manages the received data.

One technology that is applied when a failure is found in an active server is a technology in which a network connection between the active server and another server used as an alternate is changed.

Japanese Laid-open Patent Publication No. 2007-164394 discloses a related technique.

In recovery processing in which data is recovered by being transferred, however, it takes time in recovery. That is, the more data is recovered is, the more time is spent in recovery. Particularly, since services in which cloud computing is used have recently become widespread, the amount of data managed by a single server has become large. Accordingly, much more time is taken to recover from a server failure. When time taken for recovery processing is prolonged, a time period during which the redundancy of data is low is also prolonged, lowering reliability.

SUMMARY

According to an aspect of the present invention, provided is an information processing system including a plurality of storage devices, a plurality of data access devices, and a first processor. The first processor selects, when a first data access device permitted to access data in a first storage device fails, a second data access device other than the first data access device. The first data access device is included in the plurality of data access devices. The first storage device is included in the plurality of storage devices. The second data access device is included in the plurality of data access devices. The first processor permits the second data access device to access data in the first storage device. The first processor updates correspondence information, which indicates the first data access device as a transfer destination of a request to access first data in the first storage device, to indicate the second data access device as the transfer destination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will be described with reference to the drawings. These embodiments may be practiced in combination within a range in which any contradiction does not occur.

First Embodiment

A first embodiment will be described first. According to the first embodiment, if a data access device that accesses a storage device fails, another data access device is permitted to access the storage device and a request to access data in the storage device is transferred to the other data access device.

Figure 1:
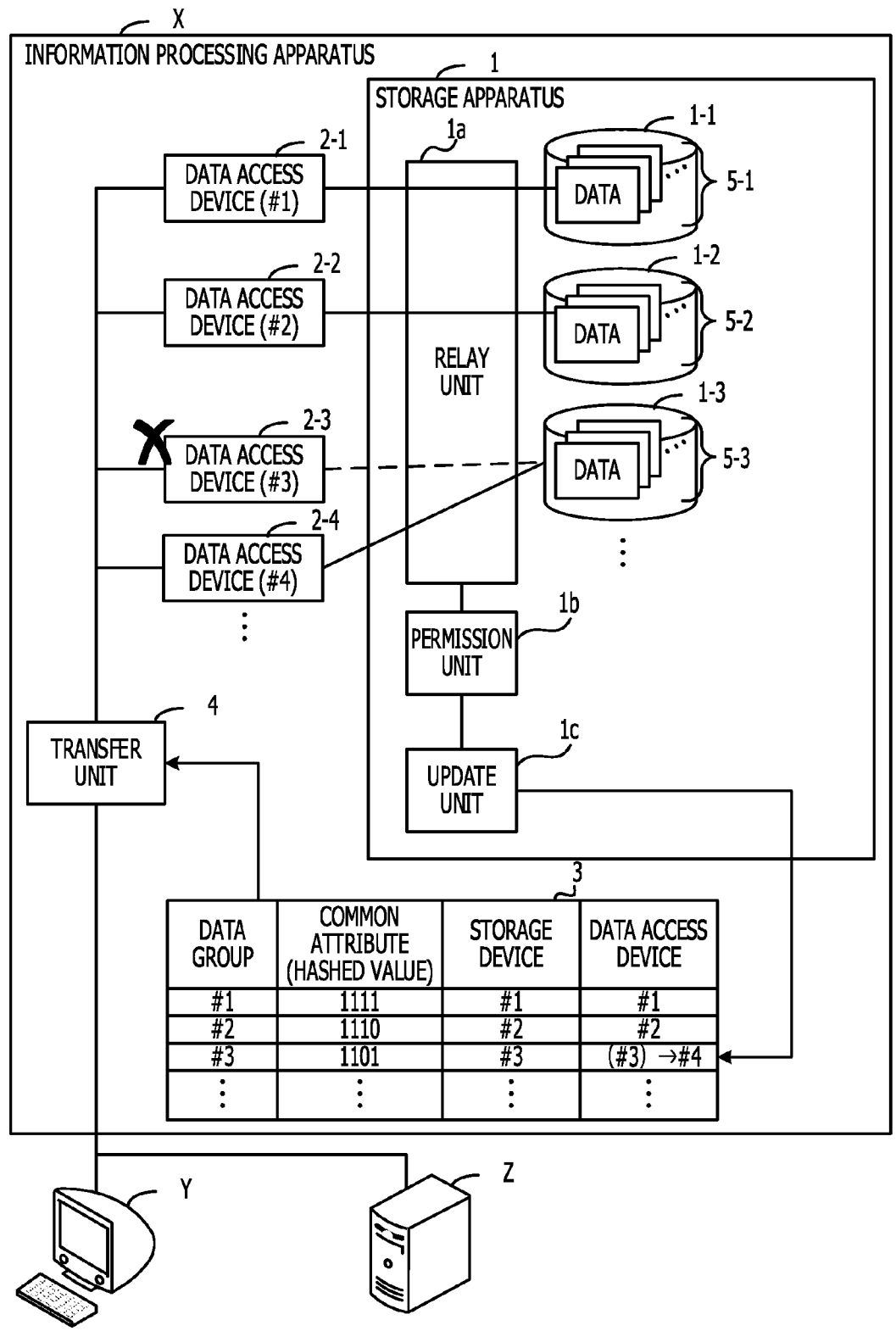
FIG. 1 is a diagram illustrating an example of a functional configuration of an information processing apparatus according to a first embodiment.

FIG. 1 is a diagram illustrating an example of a functional configuration of an information processing apparatus according to the first embodiment. An information processing apparatus X includes a storage apparatus 1, a plurality of data access devices 2-1, 2-2, 2-3, 2-4 and so on, correspondence information 3, and a transfer unit 4. The information processing apparatus X stores data in the storage apparatus 1 and reads data from the storage apparatus 1 in response to data access requests issued from a terminal apparatus Y and an application server Z.

The storage apparatus 1 includes a plurality of storage devices 1-1, 1-2, 1-3 and so on, a relay unit 1a, a permission unit 1b, and an update unit 1c. The storage devices 1-1, 1-2, 1-3 and so on are, for example, HDDs or solid state drives (SSDs). The storage device 1-1 stores a data group 5-1, the storage device 1-2 stores a data group 5-2, and the storage device 1-3 stores a data group 5-3.

The relay unit is connected to the plurality of data access devices 2-1, 2-2, 2-3, 2-4 and so on and to the plurality of storage devices 1-1, 1-2, 1-3 and so on. The relay unit is relays communication between a data access device and a storage device for which data access from the data access device is permitted. In the example in FIG. 1, one data access device and one storage device for which data access from the one data access device is permitted are connected with a solid line. The broken line, which mutually connects a data access device and a storage device, indicates that data access had been permitted but is inhibited now. The relay unit is, for example, a serial attached small computer system interface (SAS) expander or a SAS switch. In relaying communication, the SAS expander and SAS switch may use the zoning technology to limit communication to communication between a particular data access device and a particular storage device.

If a data access device that is permitted to access data in a storage device fails, the permission unit 1b permits data access from another data access device to data in the storage device. For example, if the permission unit 1b permits data access from the data access device 2-4 to the storage device 1-3, the permission unit 1b instructs the relay unit 1a to relay communication between the data access device 2-4 and the storage device 1-3.

When a new access from a data access device to data in a storage device is permitted, the update unit is updates the correspondence information 3, which indicates a correspondence relationship between the data and the data access device that serves as a transfer destination to which a request to access the data is transferred. For example, the update unit is updates the correspondence information 3 indicating a transfer destination of a data access request so that the newly permitted data access device is specified as the transfer destination of the data access request to access the data stored in the storage device. For example, when the data access device 2-4 is permitted to access data in the storage device 1-3, the update unit is updates the correspondence information 3 so that a request to access data in the storage device 1-3 is transferred to the data access device 2-4. For example, the update unit is sets identification information of the data access device 2-4 in the correspondence information 3 in association with identification information of the storage device 1-3 or identification information of data that is stored in the storage device 1-3.

The data access devices 2-1, 2-2, 2-3, 2-4 and so on receive a data access request through the transfer unit 4. The data access devices 2-1, 2-2, 2-3, 2-4, and so on access data that is indicated by the received data access request and is stored in a storage device for which communication is permitted by the relay unit 1a. For example, when the data access request is a data write request, the data access device writes the data into the storage device. When the data access request is a data read request, the data access device reads out the data from the storage device and transmits the read-out data to the terminal apparatus Y or application server Z, from which the data access request has been transmitted.

The correspondence information 3 indicates transfer destinations for data access requests. The correspondence information 3 is stored in, for example, a main memory or an auxiliary storage device of the information processing apparatus X. The correspondence information 3 includes a common attribute of data group stored in each storage device and also includes information indicating a data access device to which a request to access data in the storage device is transferred. The common attribute of each data group is common to all data items stored in the same storage device. For example, a hashed value created from data or from information for managing the data may be used as a common attribute.

For example, the transfer unit 4 transfers a request to access data in the storage device 1-3 to the data access device 2-4 in accordance with the correspondence information 3. For example, the transfer unit 4 obtains the common attribute of the data specified in the data access request. The transfer unit 4 then references the correspondence information 3 to identify a data access device that is associated with the obtained common attribute. The transfer unit 4 transfers the data access request to the identified data access device.

In the information processing apparatus X described above, if any data access device fails, another data access device is permitted to access a storage device for which data access from the failed data access device has been permitted. For example, it is assumed that the data access device 2-3 fails in a state in which the data access device 2-3 is permitted to access data in the storage device 1-3 but the data access device 2-4 is not permitted to access data in the storage device 1-3. The permission unit 1b selects a data access device to be permitted to access the storage device 1-3 instead of the data access device 2-3 from data access devices that are operating normally. For example, it is assumed that the data access device 2-4 is selected. The permission unit 1b permits the selected data access device 2-4 to access data in the storage device 1-3. For example, the permission unit 1b instructs the relay unit 1a to relay communication between the data access device 2-4 and the storage device 1-3.

Next, the update unit is updates the correspondence information 3 so that the data access device 2-4 is specified as the transfer destination of a request to access data stored in the storage device 1-3. For example, the update unit 1c changes, in the correspondence information 3, the identification number of the data access device associated with the storage device 1-3 from the identification number of the failed data access device 2-3 to the identification number of the data access device 2-4 which has been newly permitted to make an access.

After this, when the terminal apparatus Y or application server Z enters a request to access data in the storage device 1-3 into the information processing apparatus X, the transfer unit 4 receives the data access request. The transfer unit 4 references the correspondence information 3 and determines that the transfer destination of the received data access request is the data access device 2-4. The transfer unit 4 then transfers the received data access to the data access device 2-4. The data access device 2-4 accesses data in the storage device 1-3 in accordance with the received data access request.

As described above, according to the first embodiment, if a data access device fails, another data access device is permitted to access a storage device for which data access from the failed data access device has been permitted. Thus, even if a data access device fails, it is possible to recover an environment of access to a storage device that has been accessed by the failed data access device, without transferring data. That is, when data has been made redundant, it is possible to recover the redundancy of data provided by the information processing apparatus X. When the data has not been made redundant, it is possible to recover an access environment so as to enable access to data for which access has been disabled due to a failure of a data access device.

Since the first embodiment enables the access environment to be recovered without transferring data, it is possible to quickly recover the access environment. Even if the storage device has a huge capacity, time taken to recover the access environment is not prolonged. This quick recovery of the access environment improves system reliability.

Since data is not transferred, competition between data transfer processing and service usage by the user, which would otherwise be caused during a data transfer, is also suppressed. Specifically, when data in a storage device is transferred to recover the data access environment, the data transfer involves intervention of a plurality of data access devices. Much processing power of data access devices is then used in data transfer processing in the information processing apparatus X, lowering processing power assignable to provide services to the user. Since the first embodiment enables the access environment to be recovered without transferring data, as described above, a drop in processing power used to provide services to the user is suppressed during recovery processing. Furthermore, the non-execution of data transfer results in effective use of the network bandwidth in user service, so service quality is improved.

The permission unit 1b and update unit is may be implemented by, for example, a processor included in the information processing apparatus X or storage apparatus 1. The lines, illustrated in FIG. 1, that mutually connect elements are only part of communication paths. It is also possible to set communication paths other than the illustrated communication paths.

Second Embodiment

Next, a second embodiment will be described. According to the second embodiment, if a server fails in a cloud storage system in which data is made redundant and managed, redundancy is quickly recovered. The storage system in the second embodiment functions as an object storage. The object storage is a system that manages data in data units called objects. The object storage is capable of accessing an object in accordance with information specific to the object without specifying a directory having a hierarchical directory structure.

Figure 2:
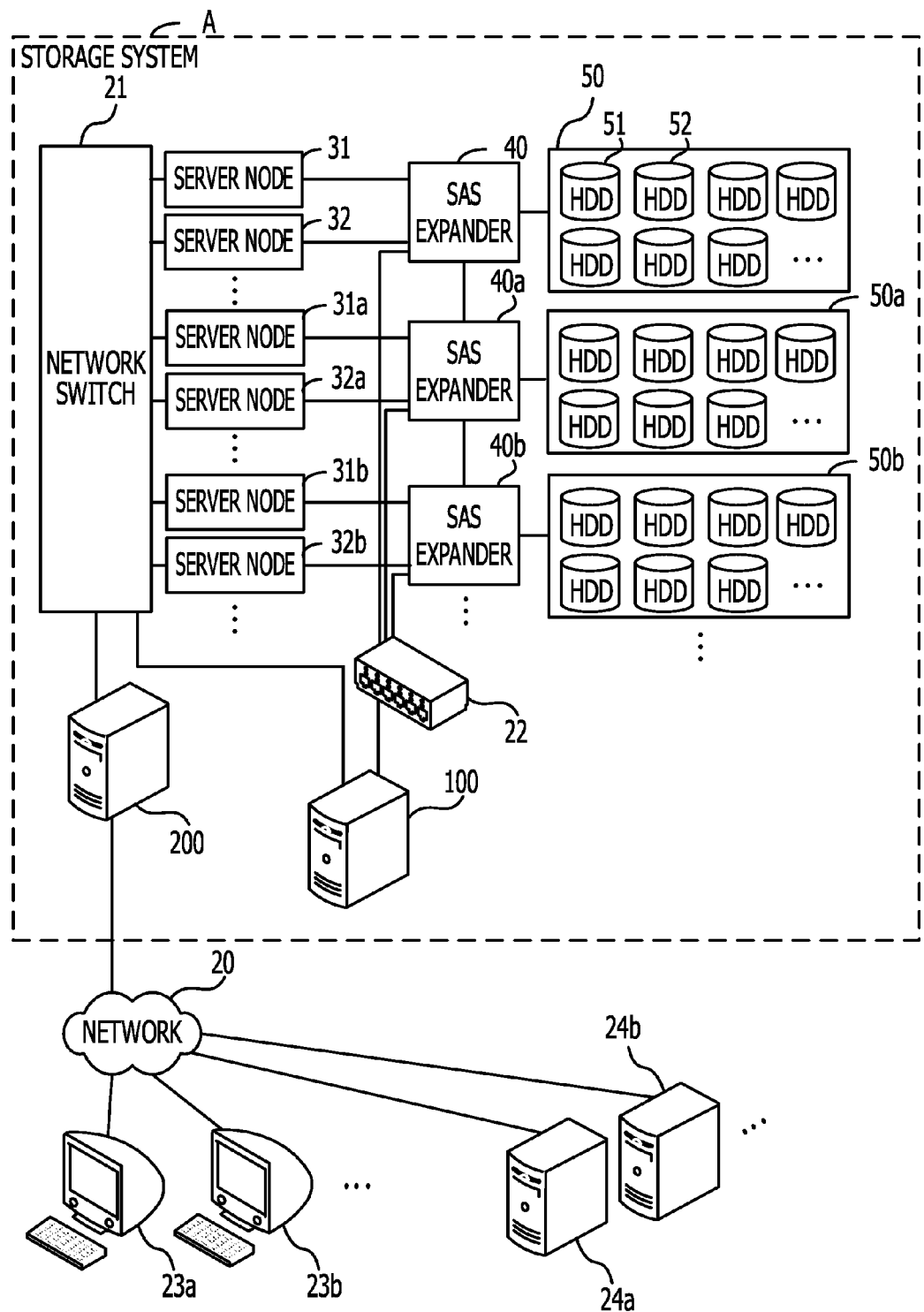
FIG. 2 is a diagram illustrating an example of a system configuration of a storage system according to a second embodiment.

FIG. 2 is a diagram illustrating an example of a system configuration of a storage system according to the second embodiment. The storage system A according to the second embodiment is connected through a network 20 to a plurality of terminal apparatuses 23a, 23b and so on or to a plurality of application servers 24a, 24b and so on that use data stored in the storage system A. The storage system A provides the usage environment of the storage in response to requests issued by users who use the terminal apparatuses 23a, 23b and so on or by the application servers 24a, 24b and so on.

The storage system A includes a control server 100, a front-end server 200, a plurality of server nodes 31, 32, 31a, 32a, 31b, 32b and so on, network switches 21 and 22, SAS expanders 40, 40a, 40b and so on, and disk enclosures 50, 50a, 50b and so on. The disk enclosures 50, 50a, 50b and so on each include a plurality of HDDs 51, 52 and so on.

The network switch 21 is used for communication between the front-end server 200 and the plurality of server nodes 31, 32, 31a, 32a, 31b, 32b and so on. For example, data access requests distributed by the front-end server 200 are transferred through the network switch 21 to server nodes. A response corresponding to a data access request from a server node is transferred through the network switch 21 to the front-end server 200.

The network switch 22 is used for communication between the control server 100 and the SAS expanders 40, 40a, 40b and so on. For example, a command to mutually connect a server node and an HDD or break a connection therebetween is transferred through the network switch 22 from the control server 100 to the SAS expander 40, 40a, 40b or the like.

The control server 100 is connected to the network switches 21 and 22. The control server 100 communicates with the SAS expanders 40, 40a, 40b and so on through the network switch 22 to control a connection between a server node and an HDD or break a connection therebetween. For example, the control server 100 enables communication between a server node and an HDD by setting zoning within SAS expanders. Zoning may be set by, for example, sending a serial management protocol (SMP) command from the control server 100 to the SAS expanders 40, 40a, 40b and so on. The control server 100 may capsulate the SMP command for setting zoning, with a packet in the Internet protocol (IP) or another protocol and may send the encapsulated command to the SAS expanders 40, 40a, 40b and so on.

The control server 100 may also communicate with the front-end server 200 and the server nodes 31, 32, 31a, 32a, 31b, 32b and so on through the network switch 21. For example, when the control server 100 has changed a relationship in connection between a server node and an HDD, the control server 100 notifies the front-end server 200 of information that indicates a new correspondence relationship therebetween. The control server 100 also periodically communicates with the server nodes 31, 32, 31a, 32a, 31b, 32b and so on to monitor whether each server node is active. The monitoring as to whether each server node is active is processing to periodically determine whether each server node is operating normally or has an abnormality.

The front-end server 200 distributes data access requests issued from the terminal apparatuses 23a, 23b and so on or the application servers 24a, 24b and so on to server nodes that manage data to be accessed. For example, the front-end server 200 distributes user's PUT/GET request for an object to a server node that manages the object. A PUT request is a request to write an object and a GET request is a request to read out an object.

The front-end server 200 determines a server node to which a data access request is distributed in accordance with, for example, information specific to an object to be accessed. For example, the front-end server 200 enters an object path that includes the object name of the object or the account name of a user who uses the object to be accessed into a hash function and obtains a hashed value. An example of the hash function to be used is the message digest algorithm 5 (MD5) or another one-way hash function. After the hash function has been calculated, a bit string with a certain width is obtained as the hashed value. The front-end server 200 determines a server node to which a request to access the object is distributed in accordance with the value of the high-order n bits of the hashed value obtained from information specific to the object (n is an integer not smaller than 1). In the front-end server 200, for example, correspondence information has been set in advance, which indicates a correspondence relationship between the value of the high-order n bits of the hashed value and a server node corresponding to the value. The front-end server 200 references the correspondence information and determines a server node to which the request to access the object is distributed.

The server nodes 31, 32, 31a, 32a, 31b, 32b and so on are each a computer including a central processing unit (CPU) and a memory. The server nodes 31, 32, 31a, 32a, 31b, 32b and so on are each connected to the network switch 21 and one of the SAS expanders 40, 40a, 40b and so on. The server nodes 31, 32, 31a, 32a, 31b, 32b and so on are each connected to HDDs through one of the SAS expanders 40, 40a, 40b and so on. The server nodes 31, 32, 31a, 32a, 31b, 32b and so on each receive a request to access an object through the network switch 21 and access the relevant connected HDD in response to the data access request.

The SAS expanders 40, 40a, 40b and so on enable communication between a server node and an HDD in response to a command from the control server 100. The command from the control server 100 is, for example, an SMP command. The connection between a server node and an HDD indicates to establish a state capable of communicating between the server and HDD. For example, the SAS expanders 40, 40a, 40b and so on send a signal sent from a server node only to the HDDs connected to the server node.

In the example in FIG. 2, a plurality of SAS expander 40, 40a, 40b and so on are cascaded in parallel. In this parallel cascade connection of the SAS expander 40, 40a, 40b and so on, the server nodes and HDDs have locality. The locality of the server nodes and HDDs enables the influence of a failure to be controlled so that it stays in a local range as much as possible. For example, when an HDD that has been connected to a failed server node is switched to another server node, the HDD is connected to a server node connected to the SAS expander to which the failed server node has been connected. Thus, a range influenced by recovery processing for a failure is restricted to server nodes that share the same SAS expander.

Unlike a storage apparatus, a plurality of SAS expanders 40, 40a, 40b and so on included in the storage system A do not have a disk controller, so they may be manufactured at low costs. In the storage system A, data is made redundant by replication among server nodes, enabling data to be made redundant without using a device based on the redundant array of inexpensive disks (RAID) technology.

Although, in the example in FIG. 2, the control server 100 and front-end server 200 are separate apparatuses, the functions of the control server 100 and the functions of the front-end server 200 may be combined into a single apparatus. At least part of the HDDs in the disk enclosures 50, 50a, 50b and so on may be replaced with SSDs.

The HDDs 51, 52 and so on in FIG. 2 are examples of the storage devices 1-1, 1-2, 1-3 and so on according to the first embodiment in FIG. 1. The SAS expanders 40, 40a, 40b and so on in FIG. 2 are examples of the relay unit 1a according to the first embodiment in FIG. 1. The server nodes 31, 32, 31a, 32a, 31b, 32b and so on in FIG. 2 are examples of the data access devices 2-1, 2-2, 2-3, 2-4 and so on according to the first embodiment in FIG. 1.

The hardware configuration of each apparatus will be described below.

Figure 3:
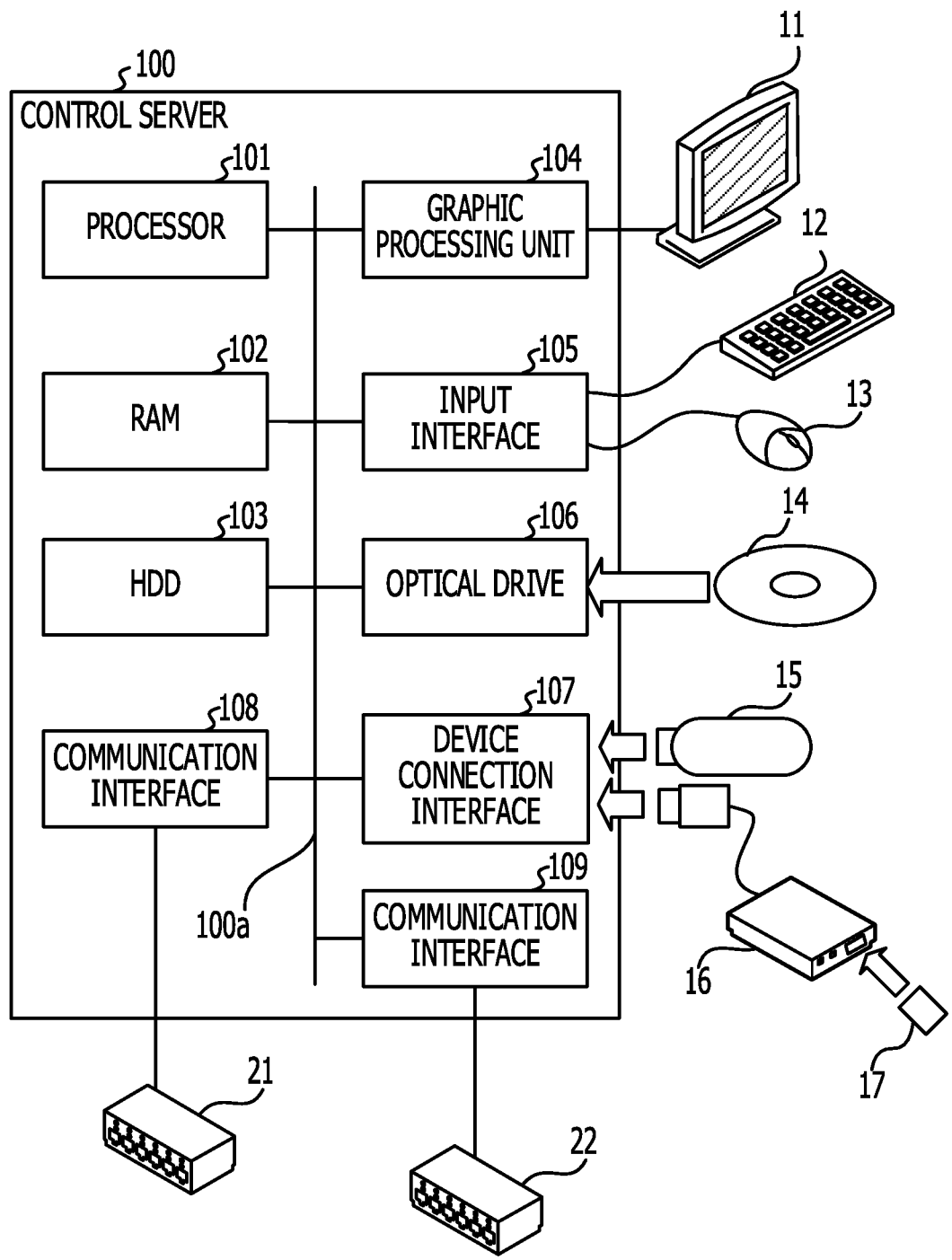
FIG. 3 is a diagram illustrating an example of a hardware configuration of a control server.

FIG. 3 is a diagram illustrating an example of a hardware configuration of a control server. The whole of the control server 100 is controlled by a processor 101. The processor 101 is connected through a bus 100a to a random access memory (RAM) 102 and a plurality of peripheral devices. The processor 101 may be a multiprocessor. Examples of the processor 101 include a CPU, a micro processing unit (MPU), a digital signal processor (DSP), an application-specific integrated circuit (ASIC), and a programmable logic device (PLD). The processor 101 may be a combination of at least two of the CPU, MPU, DSP, ASIC, and PLD.

The RAM 102 is used as a main memory of the control server 100. The RAM 102 temporarily stores at least part of an operating system (OS) program and application programs, which is executed by the processor 101. The RAM 102 also stores data used by the processor 101 for processing.

Peripheral devices connected to the bus 100a include an HDD 103, a graphic processing unit 104, an input interface 105, an optical drive 106, a device connection interface 107, and communication interfaces 108 and 109.

The HDD 103 magnetically writes data to a built-in disk and reads out data from the built-in disk. The HDD 103 is used as an auxiliary storage device of the control server 100. The HDD 103 stores the OS program, application programs, and various types of data. The auxiliary storage device may be a flash memory or another semiconductor storage device.

A monitor 11 is connected to the graphic processing unit 104. The graphic processing unit 104 displays an image on the screen of the monitor 11 in response to a command issued from the processor 101. Examples of the monitor 11 include a display unit that uses cathode ray tube (CRT) and a liquid crystal display unit.

A keyboard 12 and a mouse 13 are connected to the input interface 105. The input interface 105 receives signals sent from the keyboard 12 and mouse 13 and sends the received signals to the processor 101. The mouse 13 is an example of a pointing device and it may be another pointing device. Examples of pointing devices include a touch panel, a tablet, a touchpad, and a trackball.

The optical drive 106 uses laser beams or the like to read data recorded on an optical disk 14. The optical disk 14 is a transportable recording medium on which data is stored so that the data is capable of being read out by reflected light. Examples of the optical disk 14 include a digital versatile disc (DVD), a DVD-RAM, a compact disc read-only memory (CD-ROM), a compact disc recordable (CD-R), and a compact disc rewritable (CD-RW).

The device connection interface 107 is a communication interface used to connect peripheral devices to the control server 100. For example, a memory device 15 and a memory reader/writer 16 may be connected to the device connection interface 107. The memory device 15 is a recording medium having a function by which communication with the device connection interface 107 is made possible. The memory reader/writer 16 is a device that writes data to a memory card 17 and reads out data from the memory card 17. The memory card 17 is a card-type recording medium.

The communication interface 108 is connected to the network switch 21. The communication interface 108 communicates with the server nodes 31, 32, 31a, 32a, 31b, 32b and so on through the network switch 21.

The communication interface 109 is connected to the network switch 22. The communication interface 109 communicates with the SAS expanders 40, 40a, 40b and so on through the network switch 22.

The processing functions of the control server 100 may be implemented by a hardware configuration as described above. The front-end server 200 and the server nodes 31, 32, 31a, 32a, 31b, 32b and so on may also be implemented by hardware similar to hardware of the control server 100. The information processing apparatus X according to the first embodiment may also be implemented by hardware similar to hardware of the control server 100 illustrated in FIG. 3.

The control server 100 implements processing functions according to the second embodiment by executing programs recorded on, for example, a computer-readable recording medium. Programs in which processing executed by the control server 100 is coded may have been recorded on various recording media. For example, programs executed by the control server 100 may have been stored in the HDD 103. The processor 101 loads at least part of the programs stored in the HDD 103 into the RAM 102 and executes the loaded programs. The programs executed by the control server 100 may also have been recorded on the optical disk 14, the memory device 15, the memory card 17, and other transportable recording media. Programs stored on the transportable recording media are installed in the HDD 103 under control of, for example, the processor 101, making the programs ready for execution. It is also possible for the processor 101 to read out programs directly from the transportable recording media and execute the read-out programs.

Figure 4:
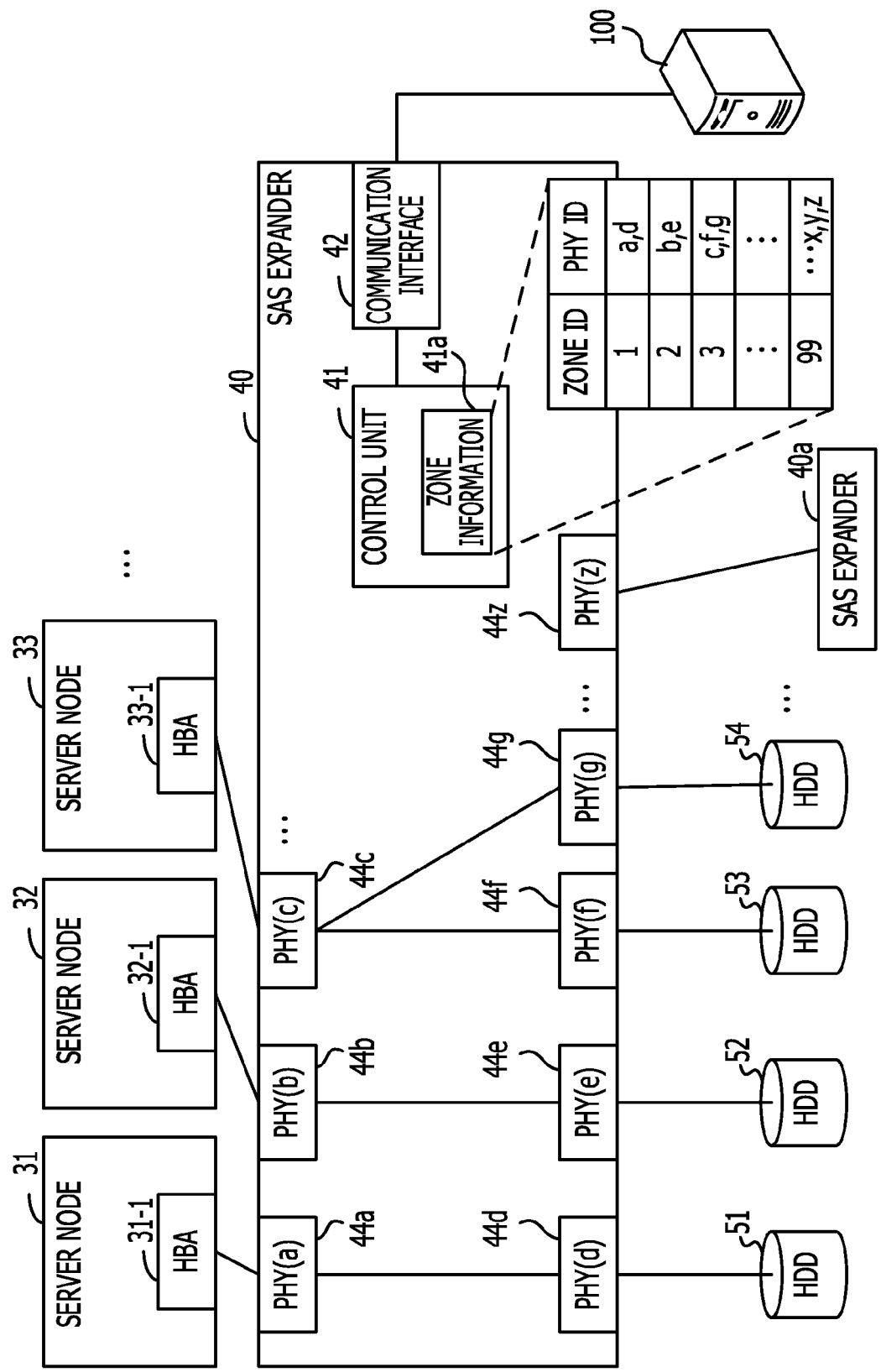
FIG. 4 is a diagram illustrating an example of a hardware configuration of an SAS expander.

FIG. 4 is a diagram illustrating an example of a hardware configuration of an SAS expander. In the second embodiment, the zoning function of the SAS expander 40 is used to control whether to permit communication between a server node and an HDD. In zoning, physical link ports are classified into a plurality of zones and communication among physical link ports that belong to the same zone is permitted within the SAS expander 40. The zone setting within the SAS expander 40 may be changed by an SMP command entered externally. To distinguish zoning within the SAS expander from zoning of server nodes, which will be described later, zones within the SAS expander will be referred to below as SAS zones.

In the description below, permitting communication between two physical link ports within the SAS expander to enable the communication to be relayed is referred to as mutually connecting a server node connected to one of the two physical link ports and a storage device connected to the other physical link port. Conversely, canceling the permission of communication between link ports within the SAS expander 40 to disable the relay of the communication is referred to as breaking a connection between a server node connected to one of the two physical link ports and a storage device connected to the other physical link port.

The SAS expander 40 has a control unit 41, a communication interface 42, and a plurality of physical link ports (PHYs) 44a, 44b, 44c, 44d, 44e, 44f, 44g, . . . and 44z.

The control unit 41 includes a CPU and a memory and controls the whole of the SAS expander 40. For example, the control unit 41 acquires a command from the control server 100 through the communication interface 42 and controls whether to permit communication between physical link ports in response to the command. For example, the control unit 41 has zone information 41a. In the zone information 41a, an identifier (SAS zone ID; denoted by "ZONE ID" in FIG. 4) of each SAS zone is set in association with identifiers (physical link port IDs; denoted by "PHY ID" in FIG. 4) of physical link ports that belong to an SAS zone identified by the SAS zone ID. The control unit 41 updates the zone information 41a indicating physical link ports that belong to each SAS zone in response to a command from the control server 100, and permits communication between physical link ports with reference to the updated zone information 41a.

The communication interface 42 communicates with the control server 100. The communication interface 42 performs, for example, serial communication with the control server 100.

The physical link ports (PHYs) 44a, 44b, 44c, 44d, 44e, 44f, 44g, . . . , and 44z are communication ports that connect the server nodes 31, 32, 33 and so on, the HDDs 51, 52, 53, 54 and so on, another SAS expander 40a, and the like. The control unit 41 controls whether to permit communication between physical link ports connected to the server nodes 31, 32, 33 and so on and the physical link ports connected to the HDDs 51, 52, 53, 54 and so on.

The server nodes 31, 32, 33 and so on respectively have host bus adapters (HBAs) 31-1, 32-1, 33-1 and so on. The HBAs 31-1, 32-1, 33-1 and so on are interfaces through which the server nodes 31, 32, 33 and so on communicate with HDDs. The HBAs 31-1, 32-1, 33-1 and so on are connected to relevant physical link ports of the SAS expander 40.

This SAS expander 40 is used to control whether to mutually connect a server node and an HDD or breaks a connection therebetween in response to a command from the control server 100. Upon receiving a command to mutually connect a server node and an HDD from the control server 100, for example, the control unit 41 updates the zone information 41a in accordance with the command so that the physical link port connected to the specified server node and the physical link port connected to the specified HDD belong to the same SAS zone. The control unit 41 then relays communication between the physical link ports that belong to the same SAS zone in accordance with the updated zone information 41a.

Upon receiving a command to break a connection between a connected server node and the relevant HDD from the control server 100, for example, the control unit 41 includes the physical link port connected to the HDD in a disconnection SAS zone. The disconnection SAS zone is a SAS zone to which no physical link port connected to a server node belongs. In the example in FIG. 4, the SAS zone ID of the disconnection SAS zone is 99. When the HDD is included in the disconnection SAS zone and the control unit 41 changes connections between physical link ports in the SAS expander 40, the HDD included in the disconnection SAS zone is disconnected from all server nodes.

As described above, the server nodes 31, 32, 33 and so on are connected to particular HDDs through the SAS expander 40. In the example in FIG. 4, the server node 31 is connected to the HDD 51, the server node 32 is connected to the HDD 52, and the server node 33 is connected to the HDDs 53 and 54. Then, the server nodes 31, 32, 33 and so on may access the HDDs connected thereto.

In the example in FIG. 4, the SAS expander 40a is connected to the physical link port 44z. As illustrated in FIG. 2, the SAS expander 40b and so on are further connected ahead of the SAS expander 40a. In this case, it is also possible to include a link port of the SAS expander 40 and a link port of the SAS expander 40a in the same SAS zone. For example, the SAS expanders 40, 40a, 40b and so on may mutually obtain device addresses or the like of other SAS expanders and assign, to the physical link ports, physical link port IDs which are unique in the system including the physical link ports of the other SAS expanders. When the SAS expanders 40, 40a, 40b and so on communicate with each other, for example, the SAS zone for the communication is specified. Thus, even if a SAS zone includes a plurality of SAS expanders, it is possible to permit communication only in the SAS zone.

Next, the functions of the control server 100 and front-end server 200 will be described.

Figure 5:
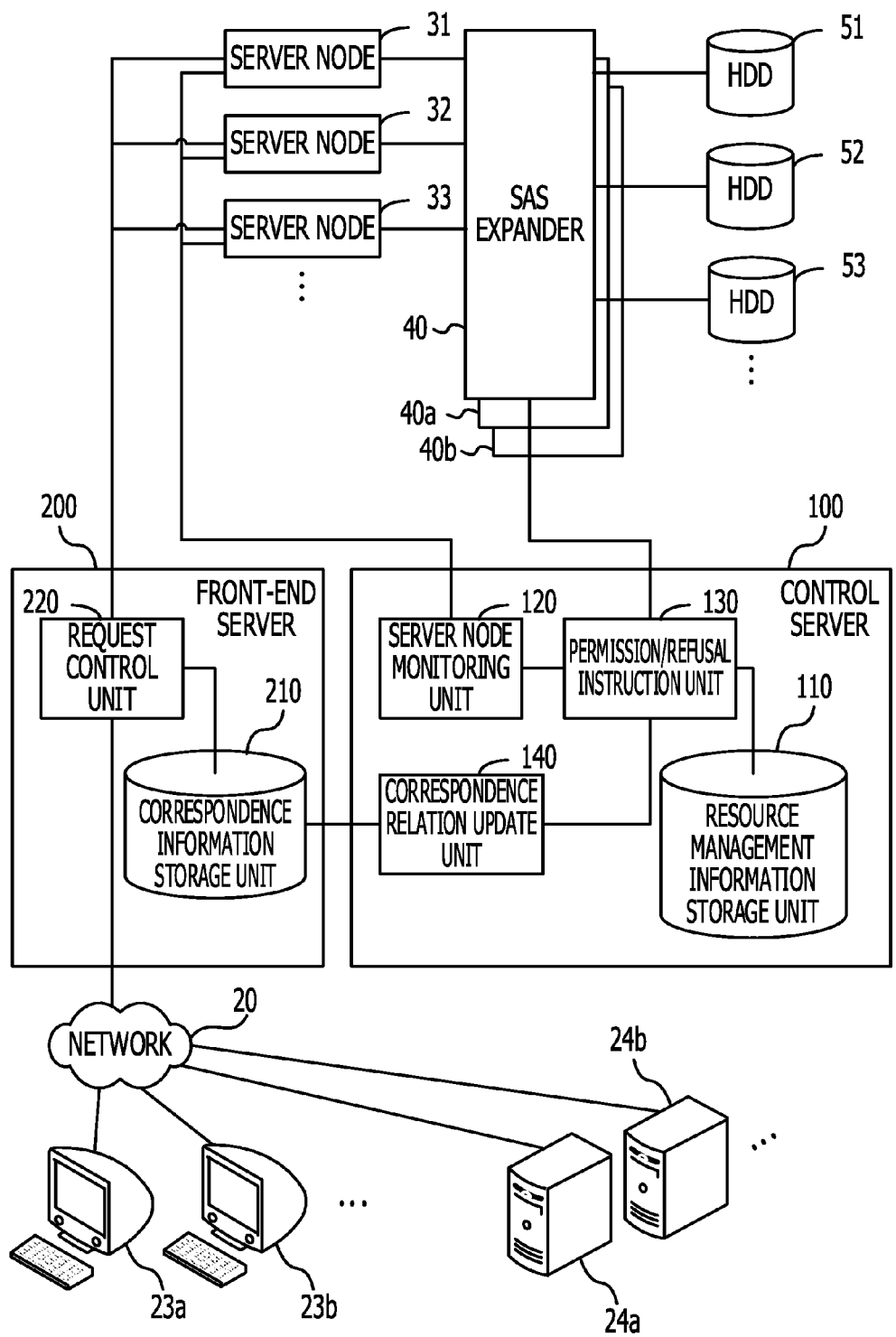
FIG. 5 is a diagram illustrating an example of functional configurations of a control server and a front-end server.

FIG. 5 is a diagram illustrating an example of functional configurations of a control server and a front-end server. The control server 100 has a resource management information storage unit 110, a server node monitoring unit 120, a permission/refusal instruction unit 130, and a correspondence relation update unit 140.

The resource management information storage unit 110 stores management information (resource management information) about server resources and disk resources. The resource management information storage unit 110 is, for example, part of the storage area of the RAM 102 or HDD 103 of the control server 100. Information about server resources in the resource management information includes, for example, information as to whether server nodes are being used and information about HDDs to be used by server nodes. Information about disk resources in the resource management information includes, for example, the IDs of physical link ports, in the SAS expanders 40, 40a, 40b and so on, to which HDDs are connected.

The server node monitoring unit 120 monitors the server nodes 31, 32, 33 and so on to see whether they are active. For example, the server node monitoring unit 120 periodically sends a control command to the server nodes 31, 32, 33 and so on and determines whether a server node is operating normally in accordance with whether the server node has replied to the control command. The server nodes 31, 32, 33 and so on may periodically send a heartbeat and the server node monitoring unit 120 may determine whether a server node is operating normally in accordance with whether the heartbeat has been received from the server node. When the server node monitoring unit 120 detects a failed server node, the server node monitoring unit 120 notifies the permission/refusal instruction unit 130 of the identification information (IP address, for example) of the failed server node.

The permission/refusal instruction unit 130 instructs the SAS expanders 40, 40a, 40b and so on to mutually connect a server node and an HDD or break a connection therebetween. Instructing an SAS expander to mutually connect a server node and an HDD indicates to instruct the SAS expander to relay data that is to be sent and received between the server node and the HDD when the server node is permitted to access the HDD. Instructing an SAS expander to break a connection between a server node and an HDD indicates to instruct the SAS expander not to relay data that is to be sent and received between the server node and the HDD when the server node is not permitted to access the HDD. For example, the permission/refusal instruction unit 130 sends, to the SAS expanders 40, 40a, 40b and so on, a command to connect an HDD that has been connected to a failed server node to another server node. The permission/refusal instruction unit 130 references the resource management information in the resource management information storage unit 110 and selects a server node as a new connection destination to which the HDD that has been connected to the failed server node is connected. After instructing the SAS expanders 40, 40a, 40b and so on to mutually connect a server node and an HDD or break a connection therebetween, the permission/refusal instruction unit 130 updates the resource management information in the resource management information storage unit 110 in accordance with the new connection relationship.

After the permission/refusal instruction unit 130 have changed the state of the connection between a server node and an HDD, the correspondence relation update unit 140 updates correspondence information retained in the front-end server 200. The correspondence information indicates a correspondence relationship between data in object units in the HDD and a server node accessible to the data. The correspondence relation update unit 140 updates the correspondence information by, for example, remotely accessing a correspondence information storage unit 210 which stores, in the front-end server 200, the correspondence information.

The front-end server 200 has a correspondence information storage unit 210 and a request control unit 220.

The correspondence information storage unit 210 stores correspondence information indicating to which server node each HDD is connected. Each HDD stores data in object units. The correspondence information storage unit 210 is, for example, part of the storage area of the RAM or HDD of the front-end server 200.

The request control unit 220 receives a data access request from the terminal apparatuses 23a, 23b and so on or the application servers 24a, 24b and so on. The request control unit 220 then identifies a server node that manages the data to be accessed, with reference to the correspondence information in the correspondence information storage unit 210. The request control unit 220 transfers the data access request to the identified server node.

The permission/refusal instruction unit 130 in FIG. 5 is an example of the permission unit 1b according to the first embodiment in FIG. 1. The correspondence relation update unit 140 in FIG. 5 is an example of the update unit 1c according to the first embodiment in FIG. 1. The request control unit 220 in FIG. 5 is an example of the transfer unit 4 according to the first embodiment in FIG. 1. The lines, illustrated in FIG. 5, that mutually connect elements are only part of communication paths. It is also possible to set communication paths other than the illustrated communication paths.

Next, a method by which the control server 100 manages resources will be described. In the second embodiment, the control server 100 classifies server nodes into a plurality of zones separately from the SAS expander zoning illustrated in FIG. 4. The control server 100 mutually connects a server node and an HDD that belong to the same zone.

There may be a case in which the front-end server 200 uses a replication technology to make data redundant. In this case, the control server 100 mutually connects server nodes and HDDs so that data items (replicas) having the same content are stored in a distributed manner in HDDs managed by server nodes in different zones.

Figure 6:
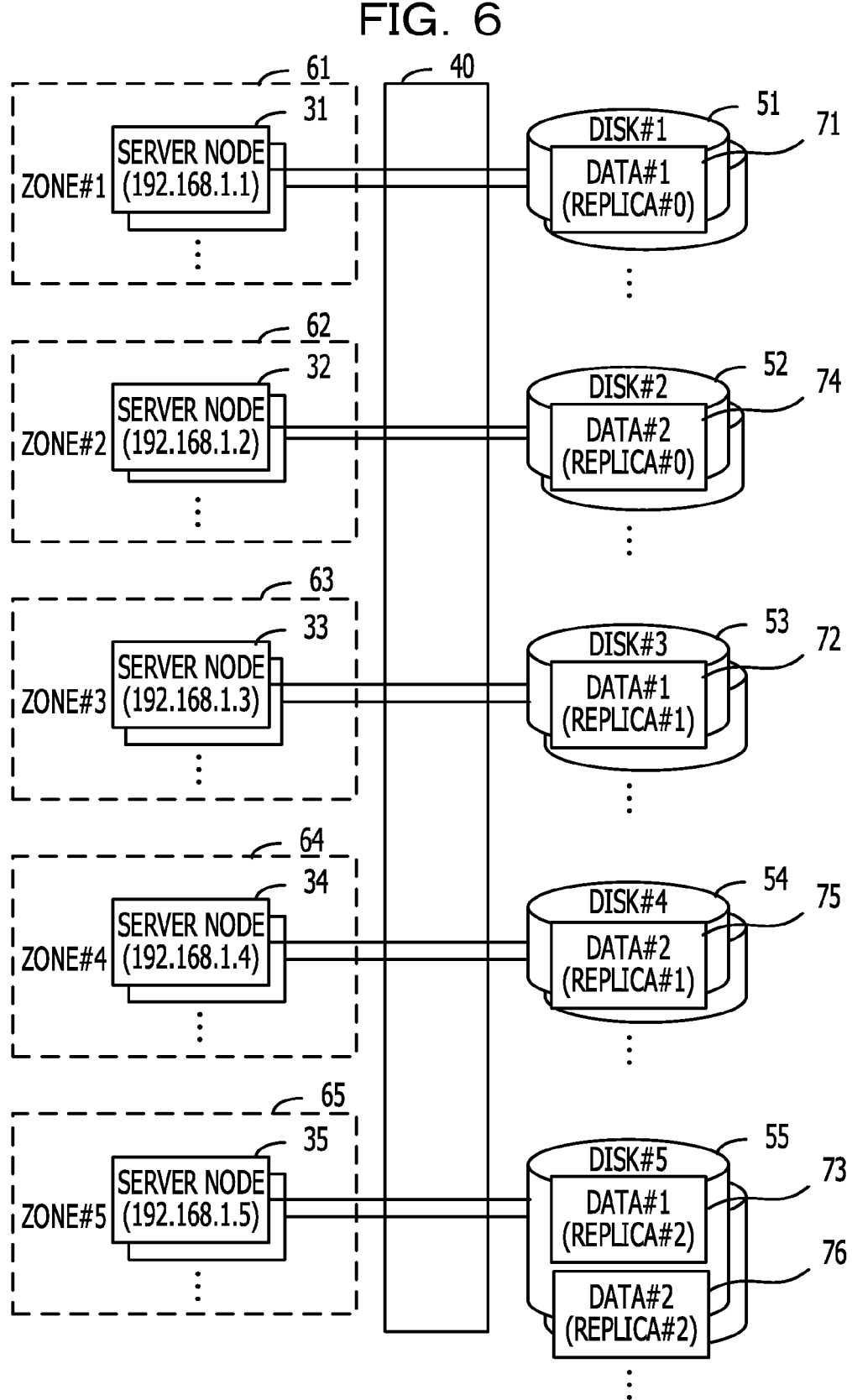
FIG. 6 is a diagram illustrating an example of a relationship between zoning of server nodes and replication.

FIG. 6 is a diagram illustrating an example of a relationship between zoning of server nodes and replication. As illustrated in FIG. 6, each of the server nodes 31, 32, 33, 34, and 35 belongs to any one of a plurality of zones 61 to 65. The HDDs 51, 52, 53, 54, and 55 are respectively connected to the server nodes 31, 32, 33, 34, and 35. The server nodes are zoned in accordance with a power supply system, racks, or another physical placement. When, for example, server nodes are zoned in accordance with a power supply system, server nodes sharing the same power supply are made to belong to the same zone.

Owing to replication, a plurality of data having the same content are stored in different HDDs in a distributed manner. In the example in FIG. 6, data 71 to 73 have the same content and data 74 to 76 have the same content. The data 71 and data 74 from which replicas have been created are represented as replica#0. Two duplicated data items are created from each of data 71 and data 74 which are the replica#0. The data 72 and data 75, which are duplicated data, are represented as replica#1. The data 73 and data 76, which are also duplicated data, are represented as replica#2.

In the second embodiment, a plurality of HDDs that store data items having the same content are connected to server nodes in different zones. Of the HDDs 51, 53 and 55, which respectively store the data 71, data 72 and data 73, which have the same content, the HDD 51 in which the data 71 is stored is connected to the server node 31 that belongs to the zone 61. Therefore, the HDD 53 in which the data 72 is stored is connected to the server node 33 that belongs to the zone 63 which differs from the zone 61, and the HDD 55 in which the data 73 is stored is connected to the server node 35 that belongs to the zone 65 which differs from the zones 61 and 63.

As described above, server nodes sharing the same power supply are made to belong to the same zone and data items having the same content are managed by server nodes in different zones. Thus, even if the operations of all server nodes stop in one zone as in a case in which the power supply fails, it is possible to avoid data from being lost.

According to the second embodiment, even when an HDD that has been connected to a failed server node is switched to another server node, a server node in the zone to which the failed server node belongs is preferentially selected as the connection destination. The HDD is connected to the selected server node. In principle, a plurality of replicas of one data item are managed by server nodes in different zones. Thus, if zones to which server nodes accessible to HDDs belong are unchanged before and after a connection of a server node to an HDD is switched, it is possible to avoid a plurality of data items having the same content from being managed by the same server node.

Next, the correspondence information in the correspondence information storage unit 210 will be described in detail.

Figure 7:
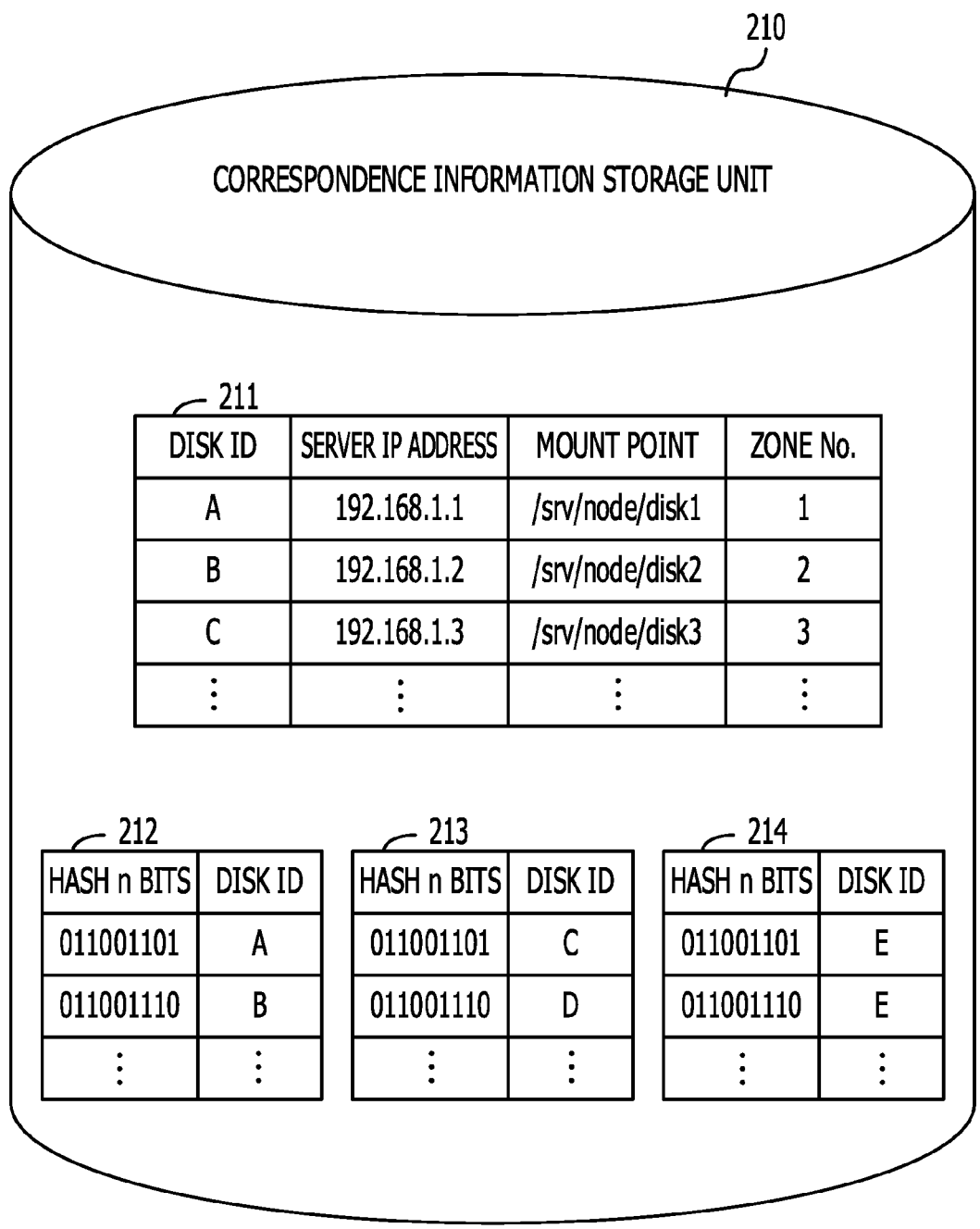
FIG. 7 is a diagram illustrating an example of a data structure of correspondence information.

FIG. 7 is a diagram illustrating an example of a data structure of correspondence information. The correspondence information storage unit 210 in the front-end server 200 has, as the correspondence information, a device management table 211 and hash correspondence tables 212, 213, and 214 provided depending on the degree of data redundancy.

The device management table 211 is a data table that stores information about connection destinations of HDDs. The device management table 211 has a "disk ID" field, a "server IP address" field, a "mount point" field, and a "zone number" field (denoted by "ZONE No." in FIG. 7). The "disk ID" field gives a system-specific identification number (disk ID) of an HDD. The "server IP address" field gives an IP address of a server node in which the HDD indicated by the disk ID is mounted. The "mount point" field gives a mount point of the HDD mounted in the server node. The mount point indicates a file in which definition information used to access the HDD and other information are written. The mounted HDD is accessible with reference to the file indicated by the mount point. The "zone number" field gives an identification number of a zone to which the HDD indicated by the disk ID is connected.

The hash correspondence tables 212, 213, and 214 are data tables that manage HDDs in which data (objects) to be accessed are stored. The hash correspondence table 212 indicates destinations at which data of the replica#0 is stored. The hash correspondence table 213 indicates destinations at which data of the replica#1 is stored. The hash correspondence table 214 indicates destinations at which data of the replica#2 is stored. The hash correspondence tables 212, 213, and 214 each have a "hash n bits" field and a "disk ID" field.

The "hash n bits" field gives a value of upper n bits of a hashed value calculated based on information specific to the data to be accessed. The "disk ID" field gives a disk ID of an HDD in which data corresponding to the value in the "hash n bits" field is stored.

A correspondence relationship between the upper n bits of a hashed value and a disk ID is determined in advance before, for example, a system operation starts and is set in the hash correspondence table 212, 213, or 214. For example, the disk ID corresponding to a value of upper n bits of a hashed value may be randomly determined from among disk IDs of HDDs in the system. Each HDD may be weighted by, for example, its storage capacity. For example, as an HDD has a larger storage capacity, a heavier weight is set for the HDD. An HDD having a heavier weight is made to correspond to upper n bits of a hashed value at higher probability. Any method may be used as a method of determining the correspondence relationship between upper n bits of a hashed value and a disk ID if a plurality of replicas having the same hashed value are made to correspond to HDDs connected to server nodes in different zones.

The correspondence information including the device management table 211 and the hash correspondence tables 212, 213, and 214 provided depending on the degree of data redundancy in FIG. 7 is an example of the correspondence information 3 according to the first embodiment in FIG. 1.

Next, the resource management information in the resource management information storage unit 110 will be described in detail.

Figure 8:
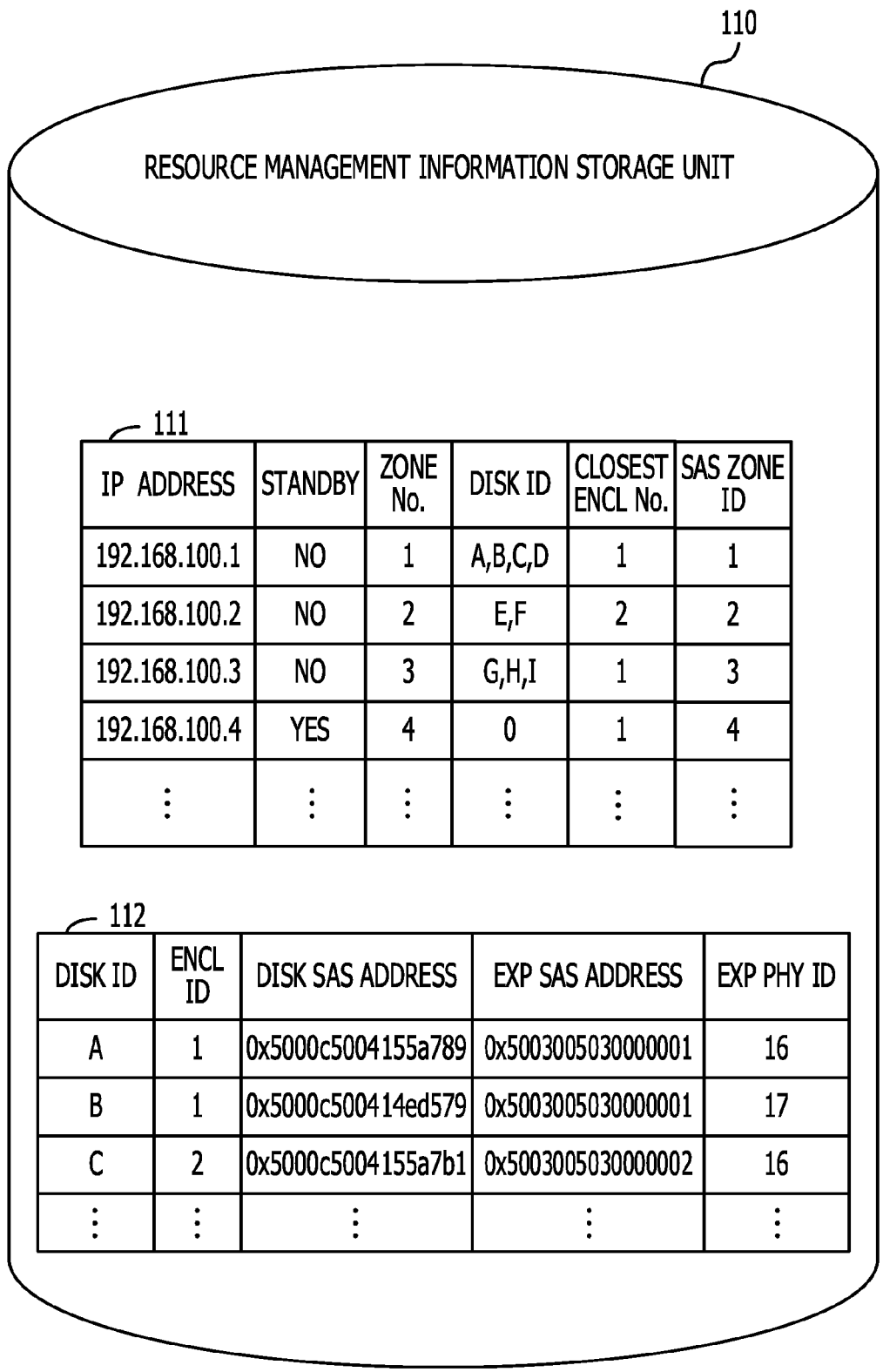
FIG. 8 is a diagram illustrating an example of a data structure of resource management information.

FIG. 8 is a diagram illustrating an example of a data structure of resource management information. The resource management information storage unit 110 in the control server 100 has, as the resource management information, a server management table 111 and a disk management table 112.

The server management table 111 is a data table for managing the states of server nodes. The server management table 111 has an "IP address" field, a "standby" field, a "zone number" field (denoted by "ZONE No." in FIG. 8), a "disk ID" field, a "closest enclosure number" field (denoted by "CLOSEST ENCL No." in FIG. 8), and a "SAS zone ID" field. The "IP address" field gives an IP address of a server node. The "standby" field gives information as to whether the server node is a standby server node or active server node. A standby server node is a server node that is not being used to provide a service to the user. An active server node is a server node that is being used to provide a service to the user. In the example in FIG. 8, when the server node is a standby server node, "YES" is indicated in the "standby" field. When the server node is an active server node, "NO" is indicated in the "standby" field. The "zone number" field gives a zone number of a zone to which the server node belongs. The "disk ID" field gives disk IDs of HDDs connected to the server node. The "closest enclosure number" field gives an identification number of a disk enclosure, out of the disk enclosures 50, 50*a*, 50*b* and so on in which HDDs are stored, closest to the server on the communication path. The closest disk enclosure is a disk enclosure for which the number of SAS expanders used to relay communication on a communication path from the server node to an HDD in the disk enclosure is smallest. For example, in the example in FIG. 2, the disk enclosure closest to the server node 31 is the disk enclosure 50. The "SAS zone ID" field gives an SAS zone ID of a SAS zone to which a physical link port connected to the server node belongs.

The disk management table 112 is a data table for managing the states of disks. The disk management table 112 has a "disk ID" field, an "enclosure ID" field (denoted by "ENCL ID" in FIG. 8), a "disk SAS address" field, an "expander SAS address" field (denoted by "EXP SAS ADDRESS" in FIG. 8), and an "expander physical link port ID" field (denoted by "EXP PHY ID" in FIG. 8).

The "disk ID" field gives a disk ID of an HDD. The disk ID is an arbitrary numeral or character string. The disk ID may be, for example, an SAS address of the HDD.

The "enclosure ID" field gives an ID (enclosure ID) of an enclosure in which the HDD is mounted.

The "disk SAS address" field gives the SAS address (an address specific to the HDD) of the HDD. The SAS address of the HDD is used by the OS in the server node to identify the HDD.

The "expander SAS address" field gives an SAS address of an SAS expander connected to the HDD. The SAS address of the SAS expander is used to identify the SAS expander during SMP communication.

The "expander physical link port ID" field gives a physical link port ID of a physical link port, to which the HDD is connected, of the SAS expander. The physical link port ID is used to specify a physical link port that belongs to an SAS zone when the setting of SAS zoning is instructed.

The system having the configuration described above enables a switchover of an HDD connected to a failed server node to another server node. When correspondence information stored in the front-end server 200 is updated in accordance with the correspondence relationship between the HDD and the other server node to which the HDD has been switched, access to the HDD, which has been connected to the failed server node, is made possible.

Selection criteria listed below are examples of selection criteria used to select another server node when an HDD that has been connected to a failed server node is switched to the other server node.

Selection-criterion_1: The server node is a standby server node.

Selection-criterion_2: The server node belongs to the zone to which the failed server node belongs.

Selection-criterion_3: The number of HDDs connected to the server node is smaller when compared with other server nodes.

Selection-criterion_4: The server node is close, on the communication path, to the enclosure having the HDD that has been connected to the failed server node. In the second embodiment, it is assumed that while in normal operation, each HDD is connected to a server node close to the HDD on the communication path. Thus, selection-criterion_4 may also be read as indicating that the server node shares the same closest enclosure with the failed server node.

According to the selection-criterion_1, when server nodes permitted to be connected to the HDD include both standby server nodes and active server nodes, a standby server node is selected. This selection criterion is effective to effectively use server node resources and reduce the loads of individual server nodes.

According to the selection-criterion_2, when server nodes permitted to be connected to the HDD include both server nodes that belong to the zone to which the failed server node belongs and server nodes that belong to other zones, a server node that belongs to the zone to which the failed server node belongs is selected. This selection criterion is effective to suppress replicas of the same data from being managed by server nodes in the same zone.

According to the selection-criterion_3, a server node connected to a small number of HDDs is selected from server nodes permitted to be connected to the HDD. This selection criterion is effective to equalize the amount of data handled by each server node.

According to the selection-criterion_4, a server node close to the HDD on the communication path is selected from server nodes permitted to be connected to the HDD. This selection criterion is effective to suppress a drop in access speed when the server node accesses the HDD. The more SAS expanders are present on the communication path between the server node and the HDD, the more the performance of disk input/output (IO) by the server node for the HDD drops. Accordingly, a drop in access speed may be suppressed by minimizing the number of SAS expanders on the communication path between the server node and the HDD.

Of the above selection criteria, at least one selection criterion may be used to select a server node to be connected to the HDD. Examples of possible combinations of selection criteria are a combination of selection-criterion_2 and selection-criterion_3 and a combination of selection-criterion_3 and selection-criterion_4. When selection-criterion_2 and selection-criterion_3 are combined, a server node to which the HDD is connected may be selected so that the number of disks is equalized among server nodes in the same zone. When selection-criterion_3 and selection-criterion_4 are combined, a server node to which the HDD is connected may be selected so that the number of disks is equalized among server nodes that share the same closest enclosure.

Any setting as to which selection criterion is used in the control server 100 may be made in accordance with the user's policy. For example, the user may make the following settings for the control server 100: specifying an IP address of a particular server node to which the HDD is connected, specifying a single selection criterion or a combination of a plurality of selection criteria, specifying priorities among a plurality of selection criteria that are applied in combination, specifying a method of selecting a server node to which the HDD is connected, which is used when there is no server node that satisfies the specified selection criterion. As an example of the method of selecting a server node to which the HDD is connected, which is used when there is no server node that satisfies the specified selection criterion, a server node may be selected so that HDDs are evenly connected to all server nodes. As another example, a server node to which the HDD is connected may be selected at random. Alternatively, a server node to which the HDD is connected may be selected in a round robin manner.

When a plurality of selection criteria are used, the permission/refusal instruction unit 130 sequentially determines whether server nodes satisfy these selection criteria and leaves applicable server nodes that satisfy the selection criteria as connection candidates, which are server nodes permitted to be connected to the HDD. When there are applicable server nodes that satisfy all selection criteria to be applied, the permission/refusal instruction unit 130 selects a server node to which the HDD is connected from these applicable server nodes.

Next, connection switchover processing will be described in detail in which an HDD that has been connected to a failed server node is switched to another server node.

Figure 9:
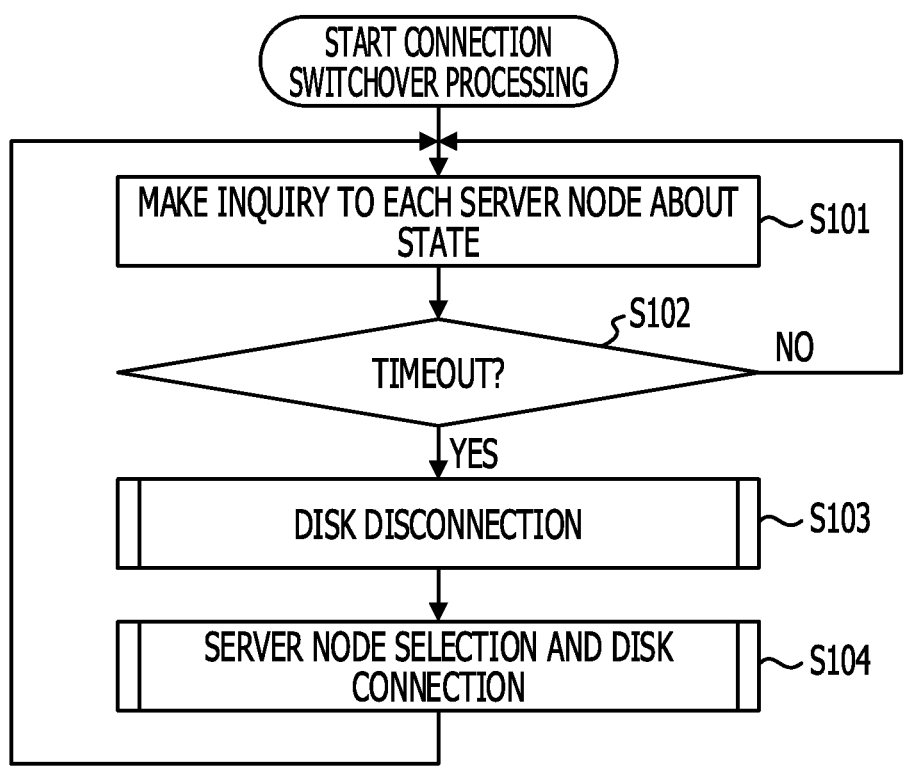
FIG. 9 is a flowchart illustrating a procedure in connection switchover processing.

FIG. 9 is a flowchart illustrating a procedure in connection switchover processing. Processing illustrated in FIG. 9 will be described in the order of the numbers in FIG. 9.

S101: The server node monitoring unit 120 in the control server 100 makes an inquiry to each server node about its state.

S102: The server node monitoring unit 120 determines whether a timeout has occurred during a wait for a reply to the state inquiry sent to the server node. For example, if a reply is not returned within a prescribed time after the state inquiry had been sent to the server, the server node monitoring unit 120 determines that a timeout has occurred. In the case of a timeout, the server node monitoring unit 120 causes processing to proceed to S103. When the server node monitoring unit 120 receives a reply without a timeout, the server node monitoring unit 120 causes processing to proceed to S101, where the server node monitoring unit 120 waits for a prescribed time and then makes an inquiry to the server node about its state.

S103: When a timeout occurs while the server node monitoring unit 120 is waiting for a reply to an inquiry about the state of a server node, the permission/refusal instruction unit 130 determines that the server node has failed. The permission/refusal instruction unit 130 then executes disk disconnection processing concerning the failed server node. Disk disconnection processing will be described later in detail with reference to FIG. 10.

S104: After having executed disk disconnection processing, the permission/refusal instruction unit 130 selects a server node and executes disk connection processing in cooperation with the correspondence relation update unit 140. Server node selection and disk connection processing will be described later in detail with reference to FIG. 11. After this, the server node monitoring unit 120 causes processing to proceed to S101, where the server node monitoring unit 120 waits for a prescribed time and then makes an inquiry to the server node about its state.

Next, disk disconnection processing will be described in detail.

Figure 10:
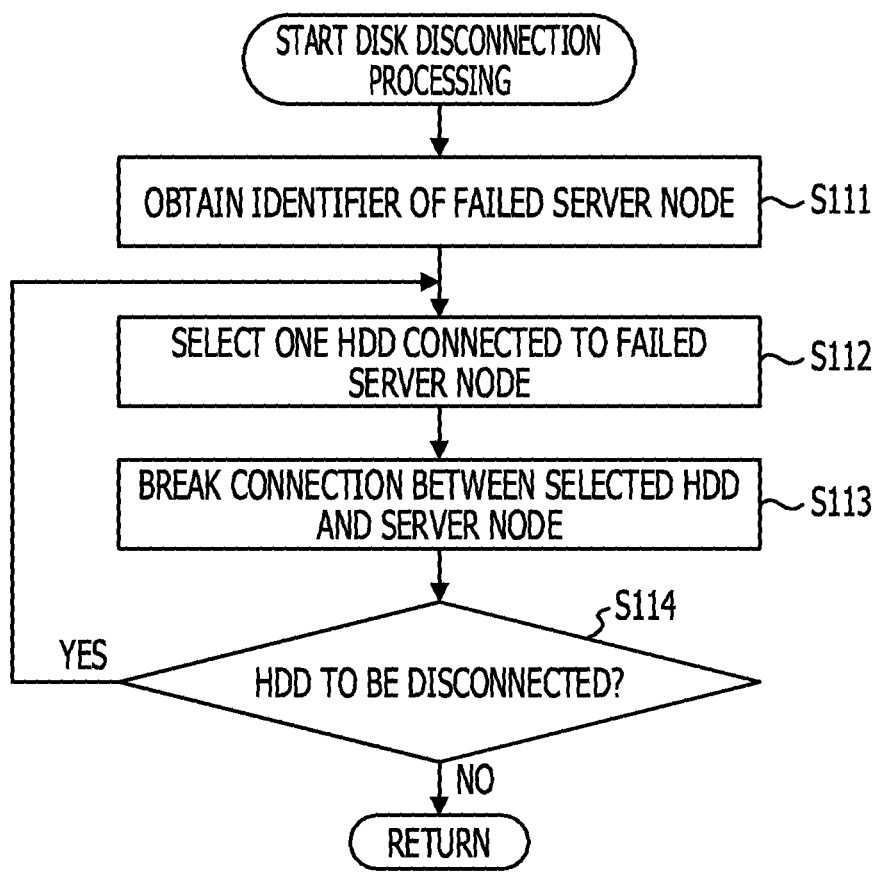
FIG. 10 is a flowchart illustrating a procedure in disk disconnection processing.

FIG. 10 is a flowchart illustrating a procedure in disk disconnection processing. Processing illustrated in FIG. 10 will be described in the order of the numbers in FIG. 10.

S111: The permission/refusal instruction unit 130 obtains an identifier (IP address, for example) of the failed server node from the server node monitoring unit 120.

S112: The permission/refusal instruction unit 130 selects one HDD connected to the failed server node. For example, the permission/refusal instruction unit 130 references the server management table 111, identifies HDDs connected to the failed server node using the disk IDs associated with the IP address of the failed server node, and selects one non-selected HDD from the HDDs connected to the failed server node.

S113: The permission/refusal instruction unit 130 instructs an SAS expander to which the selected HDD is connected to break its connection to the server node. For example, the permission/refusal instruction unit 130 references the disk management table 112 and obtains an SAS address of an SAS expander to which the selected HDD is connected and a physical link port ID of a physical link port to which the selected HDD is connected. The permission/refusal instruction unit 130 then sends, to the SAS expander having the obtained SAS address, a command to change an SAS zone to which the physical link port indicated by the obtained physical link port ID belongs to a non-connection SAS zone. In the SAS expander that has received the command, zoning is changed so that the specified physical link port belongs to the non-connection SAS zone. As a result, the connection between the failed server node and the selected HDD is broken.

S114: The permission/refusal instruction unit 130 determines whether there is an HDD that remains connected to the failed server node and has not been disconnected from it. When there is a HDD that has not been disconnected, the permission/refusal instruction unit 130 causes processing to proceed to S112. When all HDDs that have been connected to the failed server node are now disconnected, the permission/refusal instruction unit 130 terminates disk disconnection processing.

All HDDs that have been connected to the failed server node are disconnected from the failed server node in this way. After this, server node selection and disk connection processing is executed.

Figure 11:
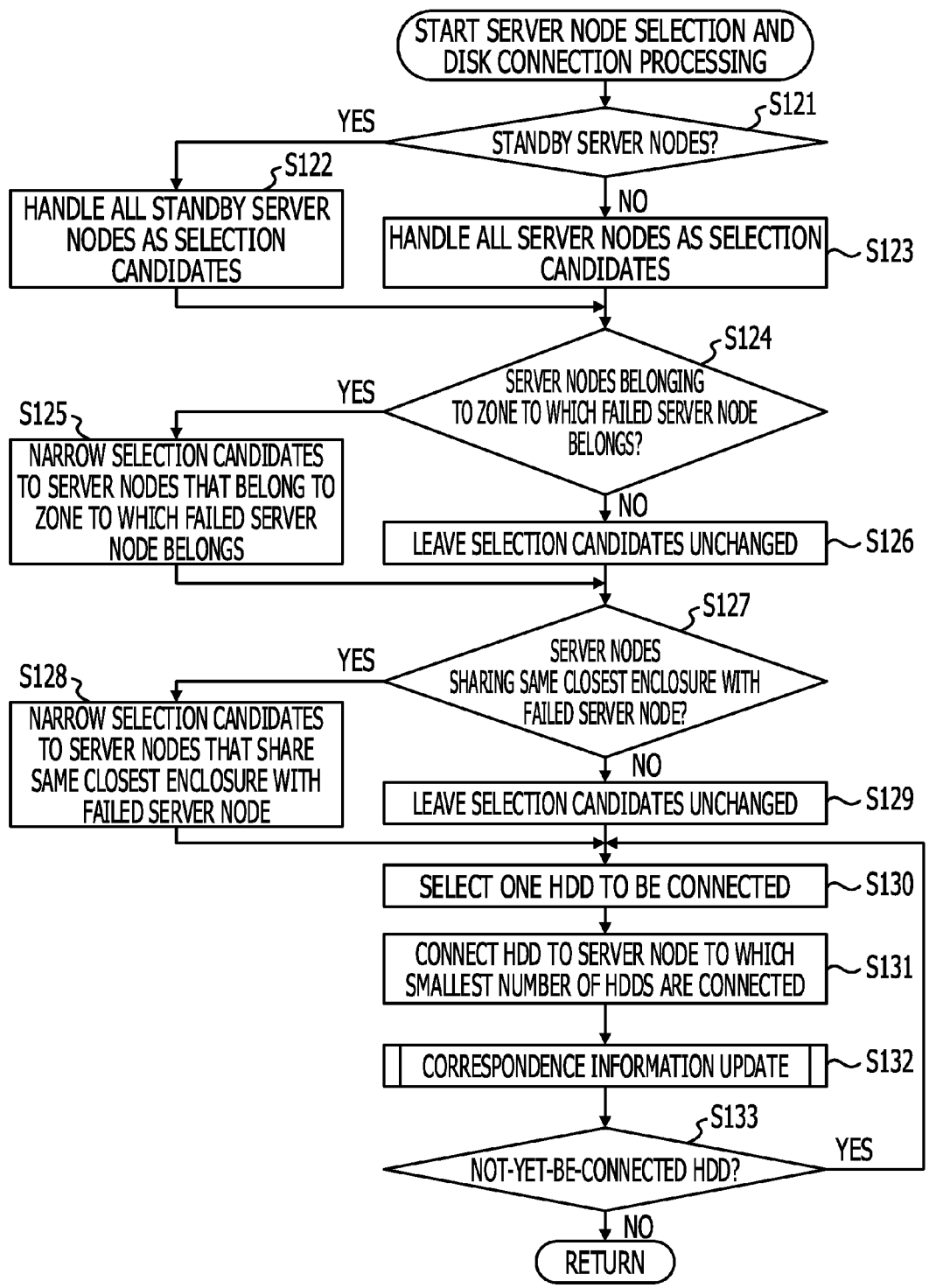
FIG. 11 is a flowchart illustrating a procedure in server node selection and disk connection processing.

FIG. 11 is a flowchart illustrating a procedure in server node selection and disk connection processing. Processing illustrated in FIG. 11 will be described in the order of the numbers in FIG. 11. In the example in FIG. 11, selection-criterion_1, by which a standby server node is selected, selection-criterion_2, by which a server node in the zone to which the failed server node belongs is selected, selection-criterion_4, by which a server node that shares the same closest enclosure with the failed server node is selected, and selection-criterion_3, by which a server node is selected to which a smaller number of HDDs are connected when compared with other server nodes, are applied in that order.

S121: The permission/refusal instruction unit 130 determines whether there are some standby server nodes among all the server nodes in the system. For example, the permission/refusal instruction unit 130 references the server management table 111, and determines that there are some standby server nodes when "YES" is indicated in the "standby" field for at least one server node. When there are some standby server nodes, the permission/refusal instruction unit 130 causes processing to proceed to S122. When there is no standby server node, the permission/refusal instruction unit 130 causes processing to proceed to S123.

S122: When there are some standby server nodes, the permission/refusal instruction unit 130 handles all standby server nodes as selection candidates. For example, the permission/refusal instruction unit 130 stores an identifier (IP address, for example) of each server node handled as a selection candidate in a selection candidate list. The selection candidate list is stored in, for example, the RAM 102. The permission/refusal instruction unit 130 then causes processing to proceed to S124.

S123: When there is no standby server node, the permission/refusal instruction unit 130 handles all server nodes in the system as the selection candidates. For example, the permission/refusal instruction unit 130 stores an identifier of each server node handled as a selection candidate in the selection candidate list.

S124: The permission/refusal instruction unit 130 determines whether the selection candidates include some server nodes that belong to the zone to which the failed server node belongs. For example, the permission/refusal instruction unit 130 references the "zone number" field in the server management table 111 and checks the zone to which the failed server node belongs against the zones to which the server nodes selected as the selection candidates belong. When at least one server node belongs to the zone to which the failed server node belongs, the permission/refusal instruction unit 130 determines that there are some server nodes that belong to the zone to which the failed server node belongs. When there are some server nodes that belong to the zone to which the failed server node belongs, the permission/refusal instruction unit 130 causes processing to proceed to S125. When there is no server node that belongs to the zone to which the failed server node belongs, the permission/refusal instruction unit 130 causes processing to proceed to S126.

S125: The permission/refusal instruction unit 130 narrows the selection candidates to server nodes that belong to the zone to which the failed server node belongs. For example, the permission/refusal instruction unit 130 deletes, from the selection candidate list, the identifiers of the server nodes that belong to zones other than the zone to which the failed server node belongs. The permission/refusal instruction unit 130 then causes processing to proceed to S127.

S126: When there is no server node that belongs to the zone to which the failed server node belongs, the permission/refusal instruction unit 130 causes processing to proceed to S127 without changing the selection candidates.

S127: The permission/refusal instruction unit 130 determines whether the selection candidates include some server nodes that share the same closest enclosure with the failed server node. For example, the permission/refusal instruction unit 130 references the server management table 111 and checks the enclosure closest to the failed server node against enclosures closest to the server nodes selected as the selection candidates. When at least one server node shares the same closest enclosure with the failed server node, the permission/refusal instruction unit 130 determines that there are some server nodes that share the same closest enclosure with the failed server node. When there are some server nodes that share the same closest enclosure with the failed server node, the permission/refusal instruction unit 130 causes processing to proceed to S128. When there is no server node that shares the same closest enclosure with the failed server node, the permission/refusal instruction unit 130 causes processing to proceed to S129.

S128: The permission/refusal instruction unit 130 narrows the selection candidates to server nodes that share the same closest enclosure with the failed server node. For example, the permission/refusal instruction unit 130 deletes, from the selection candidate list, the identifiers of the server nodes whose closest enclosures are different from the closest enclosure of the failed server node. The permission/refusal instruction unit 130 then causes processing to proceed to S130.

S129: When there is no server node that shares the same closest enclosure with the failed server node, the permission/refusal instruction unit 130 causes processing to proceed to S130 without changing the selection candidates.

S130: The permission/refusal instruction unit 130 selects one HDD to be connected but not yet be connected to another server node. An HDD to be connected is an HDD that has been connected to the failed server node until a failure occurred.

S131: The permission/refusal instruction unit 130 performs control so that the HDD selected in S130 is connected to a server node, out of the selection candidates, to which the smallest number of HDDs are connected. For example, the permission/refusal instruction unit 130 references the server management table 111 and counts the number of disk IDs that are set for each of the selection candidates. The permission/refusal instruction unit 130 then selects a server node for which the number of disk IDs is smallest and determines the selected server node as a connection destination of the selected HDD. The permission/refusal instruction unit 130 instructs an SAS expander on the communication path between the selected HDD and the server node (referred to as a destination server node) determined as the connection destination to mutually connect the selected HDD and the destination server node. For example, the permission/refusal instruction unit 130 instructs the SAS expander to include, in the same SAS zone, a physical link port to which the selected HDD is connected and a physical link port to which the destination server node is connected. The SAS expander connects the communication path between the selected HDD and the destination server node in response to the instruction from the permission/refusal instruction unit 130.

S132: The permission/refusal instruction unit 130 and correspondence relation update unit 140 cooperate to perform update processing for correspondence information included in the front-end server 200. Update processing for correspondence information will be described later in detail with reference to FIG. 12.

S133: The permission/refusal instruction unit 130 determines whether the HDDs to be connected include some HDDs not yet be connected to another server node. When there are some not-yet-be-connected HDD, the permission/refusal instruction unit 130 causes processing to proceed to S130. When all HDDs to be connected have been connected to server nodes other than the failed server node, the permission/refusal instruction unit 130 terminates server node selection and disk connection processing.

As described above, connection destinations are appropriately selected, to which HDDs that have been connected to the failed server node are connected. These HDDs are connected to the selected server nodes through the SAS expanders.

Next, procedure in correspondence information update processing will be described in detail.

Figure 12:
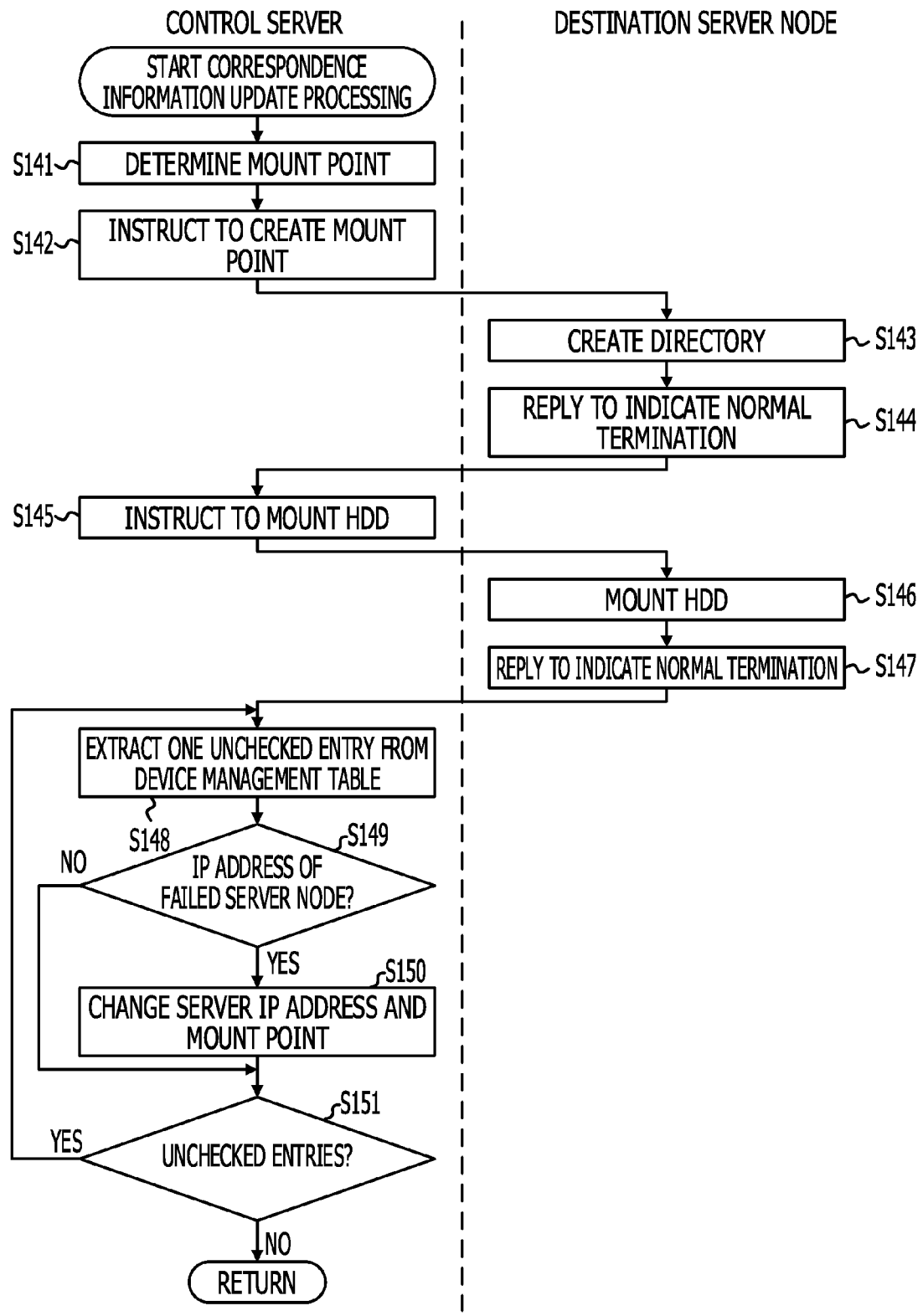
FIG. 12 is a flowchart illustrating an example of a procedure in correspondence information update processing.

FIG. 12 is a flowchart illustrating an example of a procedure in correspondence information update processing. Processing illustrated in FIG. 12 will be described in the order of the numbers in FIG. 12.

S141: The permission/refusal instruction unit 130 in the control server 100 determines a mount point by adding, to a path of a directory for mounting a device in the destination server node, a disk ID of an HDD to be connected.

S142: The permission/refusal instruction unit 130 instructs the destination server node to create the mount point.

S143: The destination server node creates a directory corresponding to the specified mount point in response to the instruction of creating the mount point.

S144: After creating the directory, the destination server node sends a reply to the control server 100 to indicate normal termination.

S145: The permission/refusal instruction unit 130 in the control server 100 instructs the destination server node to mount the HDD to be connected.

S146: The destination server node mounts the HDD to be connected in the mount point in response to the mount command.

S147: After mounting the HDD, the destination server node sends a reply to the control server 100 to indicate normal termination.

S148: The correspondence relation update unit 140 accesses the correspondence information storage unit 210 in the front-end server 200 and extracts, from the device management table 211, one entry for which processing in S149 and S150 has not been performed.

S149: The correspondence relation update unit 140 determines whether the IP address of the failed server node is set in the "server IP address" field of the extracted entry. When the IP address of the failed server node is set in the "server IP address" field, the correspondence relation update unit 140 causes processing to proceed to S150. When the IP address of the failed server node is not set in the "server IP address" field, the correspondence relation update unit 140 causes processing to proceed to S151.

S150: The correspondence relation update unit 140 accesses the device management table 211 in the front-end server 200 and updates the extracted entry. Specifically, the correspondence relation update unit 140 changes the server IP address in the extracted entry to the IP address of the destination server node. The correspondence relation update unit 140 also changes the mount point of the extracted entry to the mount point determined in S141.

S151: The correspondence relation update unit 140 determines whether there are unchecked entries in the device management table 211 in the front-end server 200. When there are some unchecked entries, the correspondence relation update unit 140 causes processing to proceed to S148. When all entries have been checked, the correspondence relation update unit 140 terminates correspondence information update processing.

As described above, according to the second embodiment, if a server node fails, the HDD that has been connected to the failed server node is switched to another server node. This suppresses a requirement to copy data in the HDD, enabling the environment used to access the HDD to be recovered within a short time. Since recovery time is shortened, a time period during which redundancy is low is shortened and thereby system reliability is improved.

Furthermore, since no data is transferred, recovery time does not depend on the amount of data in the HDD. Accordingly, even if the HDD has a large storage capacity and server nodes handle larger amounts of data, the system may quickly recover from a failure. For example, the system may recover from a failure in about one second.

In addition, since no data is transferred, a large amount of data is not written to the HDD in recovery processing, suppressing performance from being lowered due to competition of access to the HDD. A large amount of data is not transferred through the network switch 21 in recovery processing, so the network bandwidth may be effectively used to provide services to users.

Third Embodiment

A third embodiment will be described below. According to the third embodiment, when a server node is selected, priority is given to keeping performance. For example, according to the third embodiment, selection-criterion_4, by which a server node that is close, on the communication path, to an enclosure in which the HDD is mounted is selected, and selection-criterion_3, by which a server node to which a smaller number of HDDs are connected when compared with other server nodes is selected, are applied in that order. Thus, the HDD that has been connected to the failed server node is switched to another server node that shares the closest enclosure with the failed server node. Therefore, the distance between the HDD and the failed server node before the switchover of the connection is equal to the distance between the HDD and the other server node after the switchover of the connection, suppressing access performance from being deteriorated.

A system configuration for implementing the third embodiment is similar to the system configuration according to the second embodiment illustrated in FIGS. 2 to 5. However, server node selection and disk connection processing according to the third embodiment differs from that according to the second embodiment. Server node selection and disk connection processing according to the third embodiment will be described below by using the elements according to the second embodiment in FIGS. 2 to 5.

Figure 13:
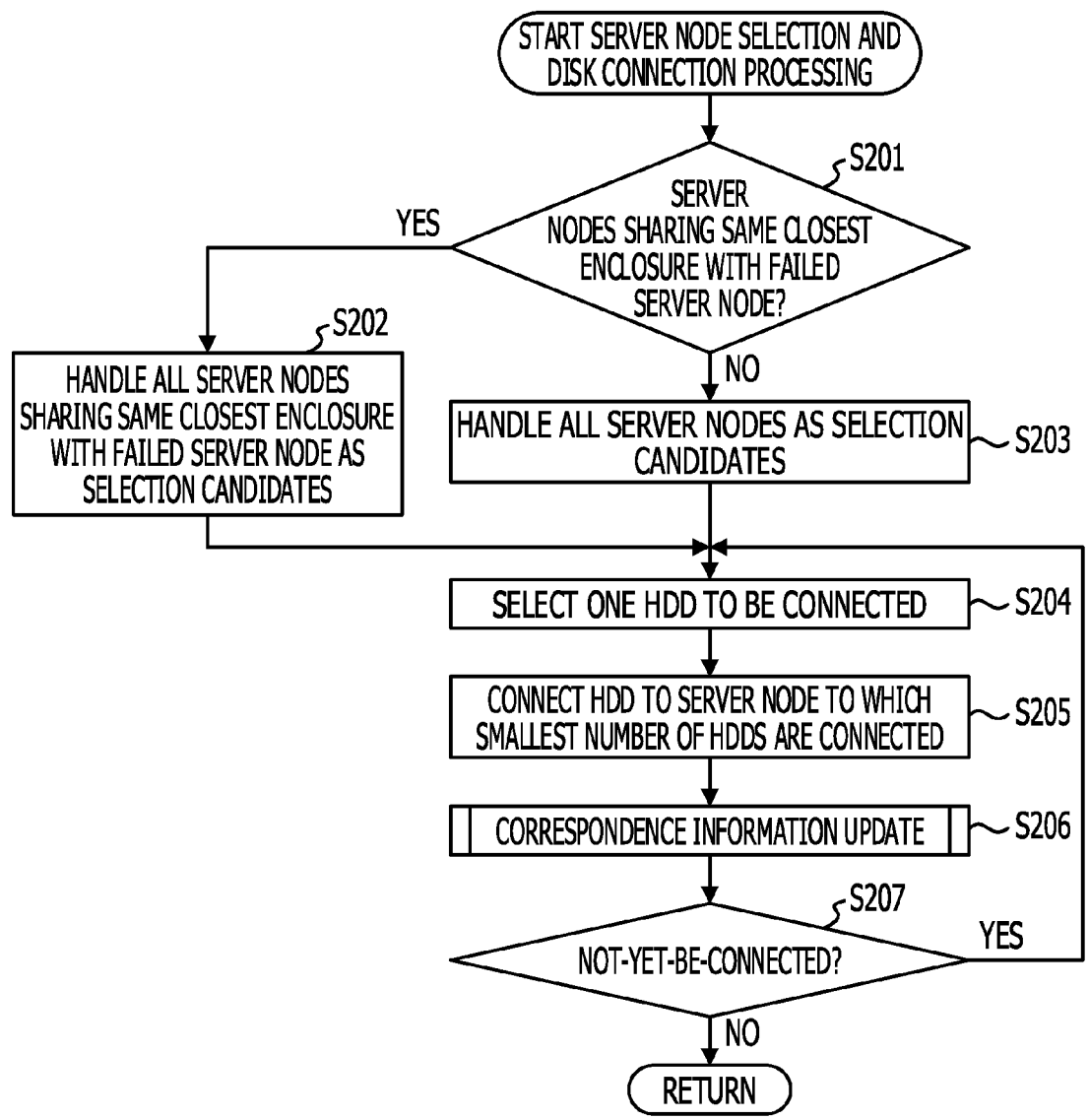
FIG. 13 is a flowchart illustrating an example of a procedure in server node selection and disk connection processing according to a third embodiment.

FIG. 13 is a flowchart illustrating an example of a procedure in server node selection and disk connection processing according to the third embodiment. Processing in S204 to S207 in FIG. 13 are similar to processing in S130 to S133 according to the second embodiment illustrated in FIG. 11, so only S201 to S203, which differ from the second embodiment, will be described in the order of their numbers in FIG. 13.

S201: The permission/refusal instruction unit 130 determines whether there are some server nodes that share the same closest enclosure with the failed server node. When there are some server nodes that share the same closest enclosure with the failed server node, the permission/refusal instruction unit 130 causes processing to proceed to S202. When there is no server node that shares the same closest enclosure with the failed server node, the permission/refusal instruction unit 130 causes processing to proceed to S203.

S202: The permission/refusal instruction unit 130 selects, from all server nodes in the system, server nodes that share the closest enclosure with the failed server node and handles the selected server nodes as selection candidates. For example, the permission/refusal instruction unit 130 stores an identifier (IP address, for example) of each server node handled as a selection candidate in a selection candidate list. The selection candidate list is stored in, for example, the RAM 102. The permission/refusal instruction unit 130 then causes processing to proceed to S204.

S203: When no server node shares the closest enclosure with the failed server node, the permission/refusal instruction unit 130 selects all server nodes in the system as selection candidates. For example, the permission/refusal instruction unit 130 stores an identifier of each server node selected as a selection candidate in the selection candidate list. The permission/refusal instruction unit 130 then causes processing to proceed to S204.

Thus, server nodes may be selected with priority given to keeping performance.

Another Embodiment

Although, in the second embodiment, a plurality of SAS expanders are cascaded as illustrated in FIG. 2, SAS expanders may also be connected in a tree structure.

Figure 14:
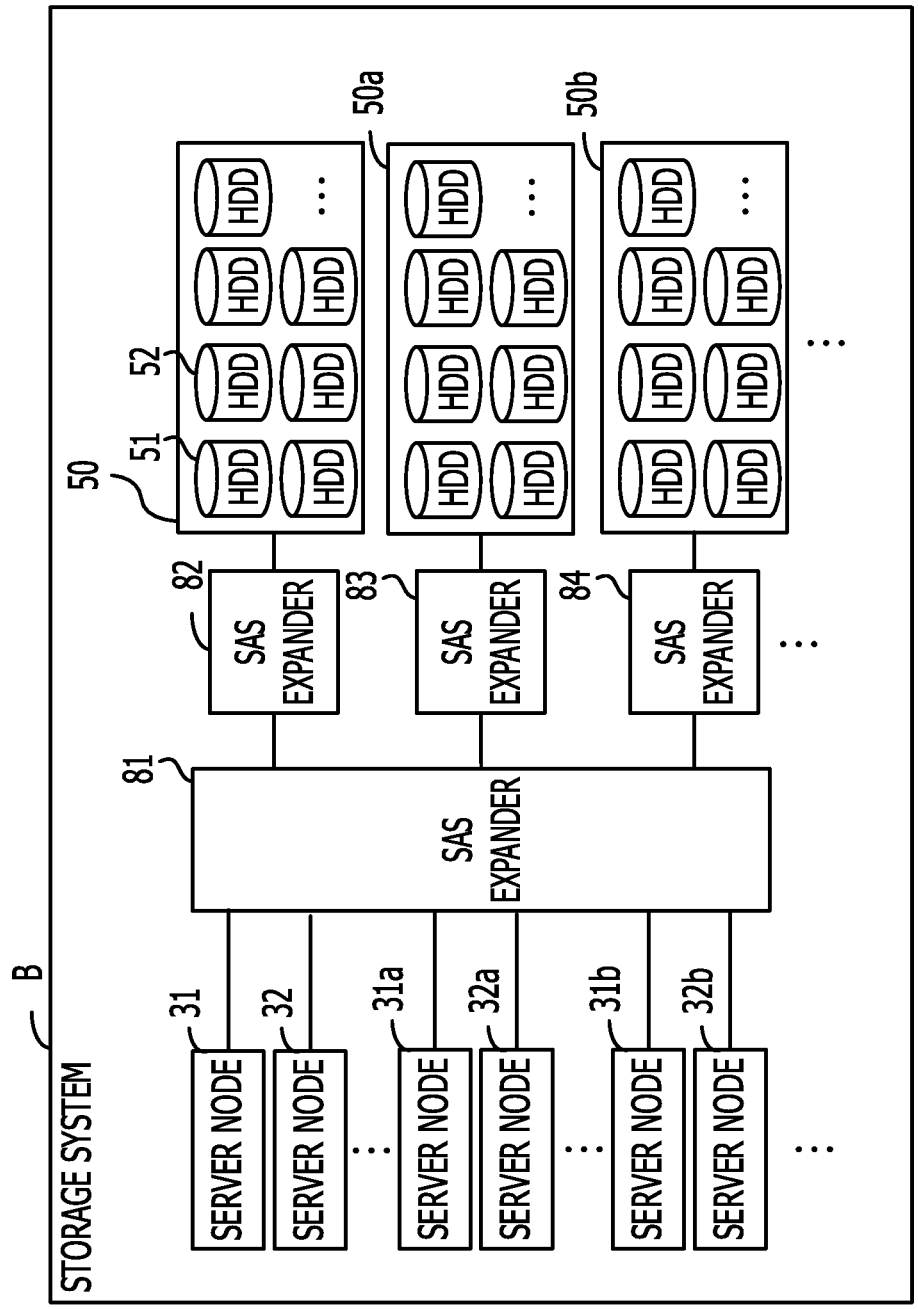
FIG. 14 is a diagram illustrating an example of connection of SAS expanders.

FIG. 14 is a diagram illustrating another example of connection of SAS expanders. In FIG. 14, similar elements to elements in the second embodiment are indicated by similar reference characters to reference characters in the second embodiment, and descriptions thereof will be omitted. In FIG. 14, the control server and the front-end server are not illustrated.

According to the storage system B illustrated in FIG. 14, a plurality of SAS expanders 81, 82, 83, 84 and so on are connected in a tree structure. Specifically, all server nodes 31, 32, 31*a*, 32*a*, 31*b*, 32*b* and so on are connected to the SAS expander 81. A plurality of SAS expanders 82, 83, 84 and so on are connected below the SAS expander 81 in the tree structure. When a plurality of SAS expanders 81, 82, 83, 84 and so on are connected in a tree structure with a plurality of levels, the system may be easily expanded by, for example, increasing the number of HDDs.

Embodiments have been illustrated above. The structure of each unit in the embodiments may be replaced with a structure having similar functions. Any other elements and any other processes may be added. Any at least two configurations (features) in the embodiments described above may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a plurality of storage devices;
a plurality of data access devices; and
a first processor to
    select, when a first data access device permitted to access data in a first storage device fails, a second data access device other than the first data access device, the first data access device and the second access device being included in the plurality of data access devices, the first storage device being included in the plurality of storage devices,
    permit the second data access device to access data in the first storage device, and
    update correspondence information, which indicates the first data access device as a transfer destination of a request to access first data in the first storage device, to indicate the second data access device as the transfer destination so that a disk connection processing connects the second access device with the first storage device,
wherein the request to access the first data is transferred to the second data access device according to the update of the correspondence information, the first data is relayed to the second data access device based on the transfer of the request to the second data access device, and the request is one of a read operation and a write operation with respect to the first data.

2. The information processing system according to claim 1, wherein the first processor manages the plurality of data access devices in groups, and
    selects, as the second data access device, a data access device that belongs to a group to which the first data access device belongs.

3. The information processing system according to claim 1, wherein the first processor selects, as the second data access device, a data access device whose communication path between the first storage device is shortest among the plurality of data access devices.

4. The information processing system according to claim 1, wherein the first processor selects, as the second data access device, a data access device having smallest number of storage devices permitted to access among the plurality of data access devices.

5. The information processing system according to claim 1, wherein the first processor manages the plurality of data access devices as to whether each of the plurality of data access devices is an active data access device or a standby data access device, the active data access device being providing a service, the standby data access device not being providing a service, and
    selects a standby data access device as the second data access device.

6. The information processing system according to claim 1, wherein the first processor instructs the second data access device to create an environment to access the first storage device.

7. The information processing system according to claim 1, further comprising:
    a second processor to transfer the request to access the first data in the first storage device to the second data access device in accordance with the updated correspondence information.

8. The information processing system according to claim 1, further comprising:
    a plurality of relay devices,
    wherein the first processor instructs a first relay device to relay communication between the first storage device and the second data access device, the first relay device being included in the plurality of relay devices, the first relay device being connected to the first storage device or the second data access device.

9. An access control method, comprising:
selecting by a computer, when a first data access device permitted to access data in a first storage device fails, a second data access device other than the first data access device, the first data access device and the second access device being included in a plurality of data access devices, the first storage device being included in a plurality of storage devices;
permitting the second data access device to access data in the first storage device; and
updating correspondence information, which indicates the first data access device as a transfer destination of a request to access first data in the first storage device, to indicate the second data access device as the transfer destination so that a disk connection processing connects the second access device with the first storage device,
wherein the request to access the first data is transferred to the second data access device according to the update of the correspondence information, the first data is relayed to the second data access device based on the transfer of the request, and the request is one of a read operation and a write operation with respect to the first data.

10. A non-transitory computer-readable recording medium storing a program that causes a computer to execute a procedure, the procedure comprising:
selecting, when a first data access device permitted to access data in a first storage device fails, a second data access device other than the first data access device, the first data access device and the second access device being included in a plurality of data access devices, the first storage device being included in a plurality of storage devices;
permitting the second data access device to access data in the first storage device; and
updating correspondence information, which indicates the first data access device as a transfer destination of a request to access first data in the first storage device, to indicate the second data access device as the transfer destination so that a disk connection processing connects the second access device with the first storage device,
wherein the request to access the first data is transferred to the second data access device according to the update of the correspondence information, the first data is relayed to the second data access device based on the transfer of the request, and the request is one of a read operation and a write operation with respect to the first data.

* * * * *